US009042205B2

(12) United States Patent
Janik

(10) Patent No.: US 9,042,205 B2
(45) Date of Patent: May 26, 2015

(54) CLOCK WITH LINK TO THE INTERNET

(75) Inventor: Craig M. Janik, Los Altos Hills, CA (US)

(73) Assignee: Viviana Research LLC, Dover, DE (US)

(*) Notice: Subject to any disclaimer, the term of this patent is extended or adjusted under 35 U.S.C. 154(b) by 518 days.

(21) Appl. No.: 12/246,585

(22) Filed: Oct. 7, 2008

(65) Prior Publication Data

US 2009/0077203 A1 Mar. 19, 2009

Related U.S. Application Data

(60) Division of application No. 09/613,322, filed on Jul. 11, 2000, now Pat. No. 7,468,934, which is a continuation-in-part of application No. 09/519,007, filed on Mar. 3, 2000.

(60) Provisional application No. 60/143,475, filed on Jul. 12, 1999, provisional application No. 60/158,986, filed on Oct. 12, 1999, provisional application No. 60/166,052, filed on Nov. 17, 1999, provisional application No. 60/122,727, filed on Mar. 4, 1999.

(51) Int. Cl.
*G04B 47/00* (2006.01)
*G04G 11/00* (2006.01)
*G04G 13/02* (2006.01)
*G06Q 30/02* (2012.01)

(52) U.S. Cl.
CPC .............. *G04G 11/00* (2013.01); *G04G 13/021* (2013.01); *G06Q 30/02* (2013.01)

(58) Field of Classification Search
USPC ............................................. 713/502; 368/13
See application file for complete search history.

(56) References Cited

U.S. PATENT DOCUMENTS

| 4,682,370 A | 7/1987 | Matthews |
| 4,866,787 A | 9/1989 | Olesen |
| 4,962,528 A | 10/1990 | Herrera |
| 5,127,045 A | 6/1992 | Cragun et al. |
| 5,276,909 A | 1/1994 | Milner et al. |
| 5,282,246 A | 1/1994 | Yang |
| 5,410,344 A | 4/1995 | Graves et al. |
| 5,420,907 A | 5/1995 | Shapiro |
| 5,434,860 A | 7/1995 | Riddle |
| 5,481,616 A | 1/1996 | Freadman |
| 5,522,089 A | 5/1996 | Kikinis et al. |

(Continued)

FOREIGN PATENT DOCUMENTS

| EP | 0733983 A2 | 9/1996 |
| EP | 0992921 A2 | 4/2000 |
| EP | 1003115 A2 | 5/2000 |
| EP | 0909112 B1 | 1/2004 |
| EP | 1 617 334 | 1/2006 |

(Continued)

OTHER PUBLICATIONS

Communication from European Patent Office for European Patent Application 00 970 882.7, mailed Dec. 16, 2009.
European Search Report for European Patent Application 06758940. 8, mailed Nov. 27, 2009.
Office Action for U.S. Appl. No. 10/775,285, mailed Dec. 1, 2009.

(Continued)

*Primary Examiner* — Kim Huynh
*Assistant Examiner* — Eric Chang

(57) ABSTRACT

A system and method wherein a personal computer is operable to access content from a networked environment and to stream the content to a device in response to a request from a user. The content accessed via the networked environment may be based on user preferences. The content may also be stored prior to streaming.

24 Claims, 17 Drawing Sheets

(56) References Cited

U.S. PATENT DOCUMENTS

| | | |
|---|---|---|
| 5,523,781 A | 6/1996 | Brusaw |
| 5,528,316 A | 6/1996 | Lee |
| 5,552,089 A | 9/1996 | Misselyn et al. |
| 5,606,594 A | 2/1997 | Register et al. |
| 5,640,453 A | 6/1997 | Schuchman et al. |
| 5,651,070 A | 7/1997 | Blunt |
| 5,701,451 A | 12/1997 | Rogers et al. |
| 5,721,827 A | 2/1998 | Logan et al. |
| 5,724,567 A | 3/1998 | Rose et al. |
| 5,739,665 A | 4/1998 | Bares |
| 5,742,599 A | 4/1998 | Lin et al. |
| 5,758,257 A | 5/1998 | Herz et al. |
| 5,768,539 A | 6/1998 | Metz et al. |
| 5,774,664 A | 6/1998 | Hidary et al. |
| 5,786,768 A | 7/1998 | Chan et al. |
| 5,790,897 A | 8/1998 | Corder et al. |
| 5,790,935 A | 8/1998 | Payton |
| 5,793,980 A | 8/1998 | Glaser et al. |
| 5,831,664 A | 11/1998 | Wharton et al. |
| 5,832,067 A | 11/1998 | Herold |
| 5,844,862 A | 12/1998 | Cocatre-Zilgien |
| 5,847,922 A | 12/1998 | Smith et al. |
| 5,852,545 A | 12/1998 | Pan-Ratzlaff |
| 5,859,970 A | 1/1999 | Pleso |
| 5,860,001 A | 1/1999 | Cromer et al. |
| 5,864,708 A | 1/1999 | Croft et al. |
| 5,884,028 A | 3/1999 | Kindell et al. |
| 5,889,506 A | 3/1999 | Lopresti et al. |
| 5,890,016 A | 3/1999 | Tso |
| 5,905,523 A | 5/1999 | Woodfield et al. |
| 5,907,322 A | 5/1999 | Kelly et al. |
| 5,907,793 A | 5/1999 | Reams |
| 5,913,039 A | 6/1999 | Nakamura et al. |
| 5,915,026 A | 6/1999 | Mankovitz |
| 5,926,624 A | 7/1999 | Katz et al. |
| 5,961,602 A | 10/1999 | Thompson et al. |
| 5,964,830 A | 10/1999 | Durrett |
| 5,974,441 A | 10/1999 | Rogers et al. |
| 5,978,807 A | 11/1999 | Mano et al. |
| 5,978,833 A | 11/1999 | Pashley et al. |
| 5,990,885 A | 11/1999 | Gopinath |
| 5,991,305 A | 11/1999 | Simmons et al. |
| 5,991,306 A | 11/1999 | Burns et al. |
| 6,005,566 A | 12/1999 | Jones et al. |
| 6,008,777 A | 12/1999 | Yiu |
| 6,011,853 A | 1/2000 | Koski et al. |
| 6,012,083 A | 1/2000 | Savitzky et al. |
| 6,023,241 A * | 2/2000 | Clapper .................. 342/357.32 |
| 6,038,542 A | 3/2000 | Ruckdashel |
| 6,043,976 A | 3/2000 | Su |
| 6,044,275 A * | 3/2000 | Boltz et al. .................. 455/466 |
| 6,052,145 A | 4/2000 | Macrae et al. |
| 6,055,566 A | 4/2000 | Kikinis |
| 6,060,993 A * | 5/2000 | Cohen .................. 340/691.6 |
| 6,104,334 A | 8/2000 | Allport |
| 6,115,248 A | 9/2000 | Canova et al. |
| 6,134,584 A | 10/2000 | Chang et al. |
| 6,141,488 A | 10/2000 | Knudson et al. |
| 6,148,353 A | 11/2000 | Cho |
| 6,154,771 A | 11/2000 | Rangan et al. |
| 6,169,879 B1 | 1/2001 | Perlman |
| 6,170,060 B1 | 1/2001 | Mott et al. |
| 6,177,931 B1 | 1/2001 | Alexander et al. |
| 6,181,284 B1 | 1/2001 | Madsen et al. |
| 6,192,340 B1 * | 2/2001 | Abecassis .................. 704/270 |
| 6,205,485 B1 | 3/2001 | Kikinis |
| 6,208,384 B1 | 3/2001 | Schultheiss |
| 6,209,011 B1 | 3/2001 | Vong et al. |
| 6,223,213 B1 | 4/2001 | Cleron et al. |
| 6,229,430 B1 | 5/2001 | Smith Dewey |
| 6,243,772 B1 | 6/2001 | Ghori et al. |
| 6,259,707 B1 | 7/2001 | Dara-Abrams et al. |
| 6,263,503 B1 | 7/2001 | Margulis |
| 6,289,165 B1 | 9/2001 | Abecassis |
| 6,292,827 B1 | 9/2001 | Raz |
| 6,304,895 B1 | 10/2001 | Schneider et al. |
| 6,321,991 B1 | 11/2001 | Knowles |
| 6,324,182 B1 | 11/2001 | Burns et al. |
| 6,326,982 B1 | 12/2001 | Wu et al. |
| 6,351,467 B1 | 2/2002 | Dillon |
| 6,353,635 B1 | 3/2002 | Montague et al. |
| 6,360,101 B1 | 3/2002 | Irvin |
| 6,401,059 B1 | 6/2002 | Shen et al. |
| 6,424,369 B1 | 7/2002 | Adair et al. |
| 6,434,403 B1 | 8/2002 | Ausems et al. |
| 6,434,747 B1 | 8/2002 | Khoo et al. |
| 6,437,836 B1 | 8/2002 | Huang et al. |
| 6,442,529 B1 | 8/2002 | Krishan et al. |
| 6,453,355 B1 | 9/2002 | Jones et al. |
| 6,467,089 B1 | 10/2002 | Aust et al. |
| 6,483,986 B1 | 11/2002 | Krapf |
| 6,484,212 B1 | 11/2002 | Markowitz et al. |
| 6,496,692 B1 | 12/2002 | Shanahan |
| 6,501,581 B1 | 12/2002 | Snyder et al. |
| 6,507,273 B1 | 1/2003 | Chang et al. |
| 6,509,908 B1 | 1/2003 | Croy et al. |
| 6,516,340 B2 | 2/2003 | Boys |
| 6,518,902 B2 | 2/2003 | Panasik et al. |
| 6,526,581 B1 | 2/2003 | Edson |
| 6,535,590 B2 | 3/2003 | Tidwell et al. |
| 6,539,433 B1 | 3/2003 | Tominaga et al. |
| 6,542,721 B2 | 4/2003 | Boesen |
| 6,549,942 B1 | 4/2003 | Janky et al. |
| 6,557,756 B1 | 5/2003 | Smith |
| 6,577,849 B1 | 6/2003 | Eaton et al. |
| 6,581,103 B1 | 6/2003 | Dengler |
| 6,587,822 B2 | 7/2003 | Brown et al. |
| 6,594,682 B2 | 7/2003 | Peterson et al. |
| 6,611,537 B1 | 8/2003 | Edens et al. |
| 6,611,654 B1 | 8/2003 | Shteyn |
| 6,650,889 B1 | 11/2003 | Evans et al. |
| 6,653,933 B2 | 11/2003 | Raschke et al. |
| 6,657,654 B2 | 12/2003 | Narayanaswami |
| 6,658,123 B1 | 12/2003 | Crutcher |
| 6,662,231 B1 | 12/2003 | Drosset et al. |
| 6,669,564 B1 * | 12/2003 | Young et al. .................. 463/42 |
| 6,678,215 B1 | 1/2004 | Treyz et al. |
| 6,678,737 B1 | 1/2004 | Bucher |
| 6,700,893 B1 | 3/2004 | Radha et al. |
| 6,708,213 B1 | 3/2004 | Bommaiah et al. |
| 6,708,217 B1 | 3/2004 | Colson et al. |
| 6,717,952 B2 | 4/2004 | Jones et al. |
| 6,725,460 B1 | 4/2004 | Nishiyama et al. |
| 6,744,763 B1 | 6/2004 | Jones et al. |
| 6,762,690 B1 | 7/2004 | Diehl et al. |
| 6,792,280 B1 * | 9/2004 | Hori et al. .................. 455/517 |
| 6,823,225 B1 | 11/2004 | Sass |
| 6,826,283 B1 | 11/2004 | Wheeler et al. |
| 6,829,648 B1 | 12/2004 | Jones et al. |
| 6,832,288 B2 | 12/2004 | Ohta et al. |
| 6,834,308 B1 | 12/2004 | Ikezoye et al. |
| 6,842,779 B1 | 1/2005 | Nishizawa |
| 6,889,382 B1 | 5/2005 | Anderson |
| 6,938,073 B1 | 8/2005 | Mendhekar et al. |
| 7,043,532 B1 | 5/2006 | Humpleman et al. |
| 7,117,259 B1 | 10/2006 | Rohwer |
| 7,117,516 B2 | 10/2006 | Khoo et al. |
| 7,130,616 B2 | 10/2006 | Janik |
| 7,191,242 B1 | 3/2007 | Serenyi et al. |
| 7,222,354 B1 * | 5/2007 | Ching et al. .................. 725/35 |
| 7,263,497 B1 * | 8/2007 | Wiser et al. .................. 705/51 |
| 7,293,280 B1 | 11/2007 | Gupta et al. |
| 7,313,808 B1 | 12/2007 | Gupta et al. |
| 7,349,975 B2 | 3/2008 | Kikinis |
| 7,366,788 B2 | 4/2008 | Jones et al. |
| 7,516,078 B2 | 4/2009 | Dhawan et al. |
| 8,296,277 B2 * | 10/2012 | Park .................. 707/705 |
| 8,438,297 B1 | 5/2013 | Chen et al. |
| 2002/0010759 A1 | 1/2002 | Hitson et al. |
| 2002/0011923 A1 | 1/2002 | Cunningham et al. |
| 2002/0038376 A1 | 3/2002 | Halliday |
| 2002/0049717 A1 | 4/2002 | Routtenberg et al. |
| 2002/0056112 A1 | 5/2002 | Dureau et al. |
| 2002/0058495 A1 | 5/2002 | Chow et al. |

(56) References Cited

U.S. PATENT DOCUMENTS

| | | | |
|---|---|---|---|
| 2002/0078248 | A1 | 6/2002 | Janik et al. |
| 2002/0087887 | A1 | 7/2002 | Busam et al. |
| 2002/0103880 | A1 | 8/2002 | Konetski et al. |
| 2003/0003872 | A1 | 1/2003 | Brinkley et al. |
| 2003/0166397 | A1 | 9/2003 | Aura |
| 2004/0117845 | A1 | 6/2004 | Karaoguz et al. |
| 2005/0028208 | A1 | 2/2005 | Ellis et al. |
| 2006/0031551 | A1 | 2/2006 | Argesta et al. |
| 2007/0033265 | A1 | 2/2007 | Anderson et al. |
| 2007/0156842 | A1 | 7/2007 | Vermeulen et al. |

FOREIGN PATENT DOCUMENTS

| | | | |
|---|---|---|---|
| GB | 2 312 591 | | 10/1997 |
| GB | 2 343 073 | | 4/2000 |
| JP | 05-047068 | | 2/1993 |
| JP | 09-161466 | | 6/1997 |
| JP | 10-177777 | | 6/1998 |
| JP | 10-340123 | | 12/1998 |
| JP | 11-331716 | | 11/1999 |
| JP | 2000-032428 | | 1/2000 |
| JP | 2000-069452 | | 3/2000 |
| JP | 2000-165845 | | 6/2000 |
| JP | 2000-181860 | | 6/2000 |
| JP | 2004-326459 | | 11/2004 |
| WO | WO-99/04568 | | 1/1999 |
| WO | WO-99/05613 | | 2/1999 |
| WO | 9918506 | A1 | 4/1999 |
| WO | 9939466 | | 8/1999 |
| WO | WO-99/65209 | | 12/1999 |
| WO | 0023899 | A1 | 4/2000 |
| WO | 0049731 | A1 | 8/2000 |
| WO | 0110124 | A1 | 2/2001 |
| WO | 0147192 | A1 | 6/2001 |
| WO | WO-02/21248 | | 3/2002 |
| WO | WO-02/21838 | | 3/2002 |

OTHER PUBLICATIONS

Non-Final Office Action on U.S. Appl. No. 11/368,871, mailed Nov. 8, 2010.
Notice of Allowance on U.S. Appl. No. 10/775,285, mailed Dec. 10, 2010.
Office Action on U.S. Appl. No. 10/775,285, mailed May 25, 2010.
Office Action on U.S. Appl. No. 11/368,871, mailed Mar. 31, 2010.
"Lightnet the web of planetary consciousness—Ericsson's entry revitalizes WebPad scene," Source: IDG-Hanover, Germany, Feb. 12, 2000, http://www.lighnet.co.uk/informer/scitech/20000301, pp. 2 pages. total.
The International Preliminary Examination Report for PCT/US01/24933 completed Aug. 19, 2004.
The International Search Report for PCT/US01/24933 mailed Aug. 20, 2002.
International Search Report and Written Opinion for PCT/US06/16861 mailed Aug. 30, 2007.
EPO communication for Application No. 01 959 676.6 dated Jan. 25, 2005.
EPO communication for Application No. 01 959 676.6 dated Jul. 26, 2005.
EPO communication for Application No. 01 959 676.6 dated Mar. 17, 2004.
EPO communication for Application No. 01 979 776.0 dated Mar. 17, 2004.
EPO communication for Application No. 01 979 776.0 dated Sep. 28, 2004.
European Search Report, Application No. EP 01 95 967.6 dated Sep. 16, 2004.
International Search Report for PCT/US00/28369 mailed Mar. 9, 2001.
International Search Report for PCT/US01/31996 mailed May 28, 2002.

EPO communication for Application 0970882.7, dated Jun. 6, 2006.
National Semiconductor, "The Age of Information Access," Online Jun. 12, 1999, XP002202547, Retrieved from the Internet on Jun. 18, 2002, <URL:http://aldenbaran.elo.utfsm.cl/datasheet/national/htm/nsc00958.htm>.
National Semiconductor, "WebPAD—Portable Web Access (datasheet)" 800605-001, Online Jul. 22, 1999, XP002202548, Retrieved from the Internet on Jun. 18, 2002, <URL:http://aldebaran.elo.utfsm.cl/datasheet/national/pdf/nsc04795.pdf>.
Sheng, S. et al., "A Portable Multimedia Terminal," IEEE Communications Magazine, IEEE Service Center, Piscataway, New York, USA, vol. 30, No. 12, Dec. 1, 1992, pp. 64-75, XP000330091, ISSN: 0163-6804.
Truman, T.E. et al., "The InfoPad Multimedia Terminal: A Portable Device for Wireless Information Access," IEEE Transactions on Computers, IEEE Inc., New York, USA, vol. 47, No. 10, Oct. 1, 1998, pp. 1073-1087, XP000781992, ISSN: 0018-9340.
"Electronic Notes," Electronic Commerce Review, Jul. 1, 1998, vol. 1 Issue: 7, Phillips Business Information.
Office Action on U.S. Appl. No. 11/131,008, mailed Sep. 2, 2009.
Office Action on U.S. Appl. No. 11/368,871 mailed Oct. 15, 2009.
Office Action on U.S. Appl. No. 11/368,871, mailed Sep. 7, 2010.
Roy, Deb K. et al., News Comm: A Hand-Held Interface for Interactive Access to Structured Audio, CHI 96 Conference, pp. 173-180, Apr. 13-18, 1996.
PR Newswire, New Company Xenote Allows Consumers to 'Bookmark the Real World' with Fun, Personal Internet Device, Jan. 25, 2000, 2 pgs.
G. Degoulet et al., EPEOS—Automatic Program Recording System, Nov. 1975, 22 pgs.
Tivo, Inc., Form S-1, Jul. 22, 1999, 902 pgs.
Cote, G et al., "Optimal Mode Selection and Synchronization for Robust Video Communications Over Error-Prone Networks," Selected Areas in Communications, IEEE Journal on, vol. 18, No. 6, pp. 952-965, Jun. 2000.
Kourtis, et al., "Interactive Digital Television at 42 GHz," Electronics Letters, vol. 33, No. 22, Oct. 23, 1997, pp. 1843-1844.
Non-Final Office Action on U.S. Appl. No. 11/131,008, mailed May 10, 2011.
Non-Final Office Action on U.S. Appl. No. 11/368,871, mailed Apr. 12, 2011.
Office Action issued on Japanese Application 2002-518716, mailed Feb. 22, 2011 (with English translation).
Non-Final Office Action on U.S. Appl. No. 11/368,871, mailed Sep. 8, 2011.
Office Action on Japanese Application 2002-518716 (English translation not available).
Decision of Rejection and Decision of Dismissal of Amendment issued on JP Application 2002-518716, mailed Jun. 6, 2012 (English Translation not available).
Non-Final Office Action on U.S. Appl. No. 11/368,871, mailed Jan. 30, 2013.
Binder, R. et al., "ALOHA packet broadcasting—A Retrospect," AFIPS 75 Proceedings of the May 19-22, 1975 National Computer Conference and Exposition, pp. 203-215.
Final Office Action on U.S. Appl. No. 11/368,871, mailed Apr. 29, 2013.
Final Office Action on U.S. Appl. No. 11/131,008, mailed Nov. 22, 2011.
Final Office Action on U.S. Appl. No. 11/368,871, mailed Jan. 13, 2012.
Non-Final Office Action on U.S. Appl. No. 11/368,871, mailed Oct. 28, 2013.
Office Action on Japanese Application 2012-220183, mailed Oct. 25, 2013. (English translation not available).
Non-Final Office Action on U.S. Appl. No. 11/131,008, mailed Oct. 21, 2013.
Final Office Action on U.S. Appl. No. 11/368,871, mailed Feb. 12, 2014.
Final Office Action on U.S. Appl. No. 11/13,108, mailed Apr. 29, 2014.

* cited by examiner

| web-enabled clock | wake-up online (download schedule) ~92   (support) ~92   (contact us) ~92

The web-enabled clock is the internet connected alarm clock.

This website allows you to create you own custom wake-up ritual that will run on your web-enabled clock. You can stream audio from any source onthe web, hear news items of interest or be alerted to appointments from your own day planning software, as you wake up.

To build your own personal wake-up routine, fill out the form below:

First Name       Last Name       Web-enabled clock serial number password       Address State [     ]   Zip [     ]

email [     ]

(reset) (submit)
         \—86

FIG. 9

| web-enabled clock | wake-up online | Web-enabled clock setup |

The internet connected alarm clock

Here are the two information sources to select from for your web-enabled clock:

88—◯ Preset wake-up routine

88—◯ Custom wake-up routine

88—◯ I want to have schedule or appointment information from my organizer software read to me every morning as part of my wake-up routine

| Palm Desktop ▼ |—84

Always send ☐ days of schedule entries to the web-enabled clock server.

locate my server file: ☐ ( Browse )
　　　　　　　　　　　　　　　　　　＼90

( Submit )
　　＼86

FIG. 10 web-enabled clock | wake-up online   Preset wake-up
program for web-enabled
The internet connected alarm clock   clock user When you set up your web-enabled clock using this Preset mode, you simply choose content you would like to hear from the selections below. The web-enabled clock server plays them for you at your wake-up time. To select the order or to choose from a larger selection of content, use the Custom Setup Application.

Start Wake-up [          ] am ○ pm ○  —88

Internet Programming Selection

☐ News —88              ☐ Music
[ NPR            ▼ ]     [ Country Western   ▼ ]
                                            84

☐ Morning Shows   [ Good Morning America  ▼ ]
   88                                      84

FIG. 11

| web-enabled clock | wake-up online

The internet connected alarm clock

Late breaking news

| A. |

News and interest

| B. |

Financial news

| C. |

Messaging

| Send a personal message to another web-enabled clock user |

FIG. 13

CLOCK WITH LINK TO THE INTERNET

CROSS-REFERENCE TO RELATED APPLICATIONS

This application is a divisional of U.S. application Ser. No. 09/613,322, filed Jul. 11, 2000, which, in turn, claims the benefit of U.S. Provisional Application Nos. 60/143,475, filed Jul. 12, 1999, entitled Alarm Clock with Link to the Internet; 60/158,986, filed Oct. 12, 1999, entitled Alarm Clock with Link to the Internet; and 60/166,052, filed Nov. 17, 1999, entitled Alarm Clock with Link to the Internet. U.S. application Ser. No. 09/613,322, filed Jul. 11, 2000, is also is a Continuation-in-Part of Ser. No. 09/519,007, which claims benefit of 60/122,727, filed Mar. 4, 1999. These applications are incorporated herein by reference in their entirety.

FIELD OF THE INVENTION

This invention is a type of clock or time and information display device that may be used to both present a wide range of content from the internet, and also alert a user at a preset time. Specifically, this device is a programmable alarm and clock that is connected to the internet for receiving programming for alarm clock functional features, as well as content that is to be presented to a user. Hereafter the present invention will be referred to as the web-enabled clock, or web-enabled alarm clock if its automatic activation is used to wake-up or otherwise alert or remind the user. The web-enabled clock delivers preferred content to a user in a contextually relevant situation.

Definitions

PC (Personal Computer) is defined as a general purpose computer commonly used by individuals for a variety of computing tasks but, with respect to the invention disclosed herein, most notably for establishing a connection to and browsing information on, the world wide web. Web, world wide web, or internet is used here interchangeably, and is defined as the sum total of all connected devices, the connection being via standardized digital communications protocols, such as TCP-IP (Transmission Control Protocol—Internet Protocol) and the like. The information transfer protocols that are used by a particular device depends on the type of devices that are connected. Currently, the hypertext markup language (HTML) is used to display pages of text content on a PC.

Local net is used interchangeably with LAN (Local Area Network) and is defined as a communication network including two or more devices. Typically, the term "local" means that the devices are located in close physical proximity. For the purposes of the invention disclosed herein, a local net for example would be a home network where several computers and other devices such as printers or fax machines would be functionally connected for the purpose of control, or sharing programming or data. A LAN may be connected either by a wired or wireless medium, and associated communications protocols. Devices that are connected via a LAN may ultimately have access to the internet if one device on the LAN is connected to the internet. Thus data can be directed to other devices through the device with the internet connection.

Browsing is a function that is performed by a user with a browsing device, often a PC with browsing software, and is defined as interactively viewing text, still images, and other types of media on webpages that use a standard format such as hypertext markup language (HTML) or XML. When browsing, to access a subsequent page or item of content, the user must actively make a request that is in the form of a mouse click or a typed character string. It is important to note that browsing requires active real-time decisions and the attention of a user, as an alternative method of interaction is presented as part of the invention disclosed herein. Browsing may occur on a variety of devices.

Associated with browsing are browsers, defined as software applications that allow navigation to specific website addresses, viewing of webpages, and the selection of links. Navigation to specific website addresses is based on the entry of specific universal resource locators (URLs) that follow the HTTP (hypertext transfer protocol) to connect to associated webpages. Browsers can view webpages in browser compatible formats such as HTML or XML, which support the ability to assign links to other URLs to elements such as text or images within webpages. Typically, browsing software runs on PCs, but is also available to work with lower powered, single purpose browsing computers.

A modem (modulator-demodulator) is a device that allows a computer to send data to another computer via a standard analog phone line. DSL (Digital Subscriber Line) is a transmission technology that also uses existing copper phone lines but provides for much faster data rates, compared to conventional analog modems. Modems, cable modems, and DSL are all well known technologies and will not be described here in detail.

An internet service provider (ISP) is defined as a business that provides end users with a connection to the Internet. For example, many ISPs provide dial-up numbers that are answered by large banks of modems maintained by the ISPs at one or more locations. The ISP's modems bridge between the end user's PC modem and a fast connection to the internet. Many ISP's also provide broadband access for home computer users and businesses.

BACKGROUND OF THE INVENTION

The proliferation of telecommunications infrastructure has resulted in the ubiquitous availability of internet connections. A significant portion of U.S. households have PCs that contain modems, providing users with access to the internet through dial-up connections to ISPs. Recently, broadband internet connections such as cable modems and DSL have been gaining popularity and increasing in market share, especially in the home market. The popularity and extension of a fast digital communication medium into the home is providing the opportunity to bring increased functionality to a variety of devices, as well as driving the creation of whole new classes of connected products. At the same time, the phenomenon of the world wide web has vastly increased the amount of information that is available in digital format. The information available on the web extends across many different media, including text, still images, audio files, streaming audio, and video. There is a great deal of new information on the web that in multimedia format, a combination of still images, audio, and full motion video.

Another technology that is driving ubiquitous access to the internet is home networking (LAN) technology. There is a need for users to connect multiple PCs in the home, or to connect one or more PCs to peripheral devices such as printers, facsimile machines, or broadband gateways. Currently, there are three competing technology mediums for home networking: wireless (radio frequency), AC powerline, and phone line systems. The AC powerline systems are comprised of a data signal superimposed on the 60 cycle alternating current in home electrical wiring systems. Phone line systems likewise include a data signal superimposed at a different frequency, on home phone wiring. Each of these technologies has advantages and disadvantages, and all three currently co-exist in the marketplace. For example, Intel Corporation, of Santa Clara, Calif., markets products that use variously all three of these mediums, under the brand name AnyPoint™. The speed of these technologies varies slightly and the data transfer rate is being made quickly in each technology. For example, the Intel Any Point™ wireless system is actually manufactured by Proxim of Sunnyvale, Calif. Proxim's wireless technology is based on an industry standard for wireless networking technology called HomeRF™. HomeRF™ is based on IEEE (Institute of Electrical Electronic Engineers, Inc.) standard 802.11 which uses the 2.4 gigahertz part of the wireless spectrum. HomeRF™ can currently achieve data rates of approximately 1.6 mbps (million bits per second).

New products have been introduced to take advantage of the availability of ubiquitous internet connections, to allow users to gain access to the vast storehouse of information on the web. Many of these new products attempt to bring browsing capability to scenarios other than the use of a PC. A new class of devices was created when WebTV of Palo Alto, Calif., introduced a product called a set-top box. Set-top boxes are devices that connect to the internet, usually through a dial-up modem, allowing users to browse the internet using their television as the visual output device. Set-top boxes also typically include keyboards or a pointing device to allow the user to interact with an on-screen or on-line interface. Set-top boxes bring greater functionality to televisions.

Another example of a device that is not a PC that attempts to take advantage of on-line access to information is the iPhone, manufactured by infoGear of Redwood City, Calif. The iPhone is an integrated telephone-browser system. It includes a medium size display and an integral modem so that the user can access the web and especially email, at the phone apparatus. The iPhone is also a standalone browser, providing universal access to all content on the world wide web in an interactive format.

The majority of devices that provide connectivity and access to content on the internet provide a browsing function. However, there are other devices in the home or in business locations that can provide substantial function by simply presenting, displaying, or playing information content to a user, rather than supporting fully interactive browsing.

A category of products that are information devices that typically present or play information or content are clocks, alarm clocks, and clock radios. There is a diverse product offering within the product category of clocks and alarm clocks. Clocks with integrated radio receivers, known as clock-radios, are very common. Clock radios typically offer the ability for the user to set the wake up sound as either an alarm sound or radio programming in the AM or FM band. Of course, clock radios are limited to the existing broadcast media selection for the content that they can present to the user. The broadcast model is such that many users listen to the same information. There are also alarm clocks with integrated compact disk players, so that users can further customize the audio wake-up content. The CD/Alarm Clock with Sound Soother® offered by The Sharper Image, of San Leandro, Calif., includes an integrated sound generation machine (the Sound Soother®) that provides soothing sounds, such as running water, waterfall, rain, and the like, as well as a compact disk (CD) player. The soothing sounds cannot be changed because they are stored in the solid state memory of the device. The display on this device also shows the day, the date, room temperature, and time zone. Clocks or alarm clocks with integral media playback devices, such as a CD player, are also limited since the user must load a new CD into the device if they want to hear different or new content. And only content that exists in a CD format can be played.

There have been attempts to add customized content functionality to clocks and alarm clocks. U.S. Pat. No. 5,708,627 to Gormley shows an electronic device that stores audio messages entered by the user onto digital chips. Each message is given a chronological code so that the message can be automatically played at a specified date and time. This device provides for some customized content to be played back to the user as an alarm or as a reminder. However, the playback content is limited to that which is recordable by the user. This requires a substantial amount of effort for the user to create new alarm content.

U.S. Pat. No. 4,070,697 to Miller et al, and U.S. Pat. No. 5,365,494 to Lynch, also disclose a system with a basic function which is to allow the user to record and store custom content, such as verbal reminder messages, and to link these stored bits of content to specific alarm trigger times. At the specified times, the pre-recorded pieces of content are played as alarms or reminders. These systems require significant effort by the user to create new content to be played as alarms.

U.S. Pat. No. 5,621,458 to Mann et al discloses a docking and control apparatus for portable electronic entertainment devices. One function of this device is that it can be used to trigger activation of a variety of consumer electronic devices, for example a video camcorder unit. In this example it is assumed that the user has prerecorded content on the video camcorder, that is played back. The device may also use an integral generic message stored in memory, or a custom message that has been added by the user, as the content that is played when the alarm date and time occurs. Additionally, the device can drive a computer video monitor or television as video output devices. Again, this device requires the user to create some or all of the original content that might be played back.

U.S. Pat. No. 4,712,923 to Martin is an electronic calendar that displays the time, day, day of the week, month and year, and also displays preprogrammed and user programmed information such as holidays, birthdays, anniversaries, appointments, and other messages. One interesting feature is a function that provides for the randomly selected displaying of programmed messages such as advertisements and safety slogans at recurring times to reinforce the user's memory of such messages. Again, adding new content into this device requires substantial programming effort by the user.

What is needed is a product that simply and automatically presents customized information to a user in a specific situation at a pre-determined time. The product should include the ability to set up the user-specific preferences for the content that is delivered, based on the diverse and prolific amount and types of information available on the internet.

SUMMARY OF THE INVENTION

The present invention is a web-enabled clock; an electronic clock and display device with alarm functionality and internet connectivity. The web-enabled clock includes a housing with an internal electronic circuit that contains a networking function, a display, a speaker, a power supply, and controls typically found on an alarm clock, including a snooze button. The web-enabled clock also contains a radio tuner. The web-enabled clock connects to the internet on a daily basis to receive custom or preferred content from the internet based on selections made by a user at a web-enabled clock set-up website.

The content that is received and played back automatically for the user may consist of a variety of content types such as news, weather, and traffic information, affinity content (content specific to areas of interest to the user), and the entries for the user's daily schedule that has been synchronized from the user's personal information manager (PIM) database.

Furthermore, web-enabled clock features may be specified to be modified or changed at the clock setup website. For example, an automatic snooze activation, or a fade-in of the alarm audio content volume could be specified on the website, and these parameters would then be downloaded to the web-enabled clock during the daily or otherwise periodic connection interval.

An important function that the web-enabled clock would perform is that the user's daily schedule, or portion of the user's daily schedule, could be audibly or visually presented to the user as part of the wake-up alarm process. The user would control this function via the controlling software as mentioned above. Therefore, a software program will exist that will take schedule data, as extracted from a user's existing scheduling software and move this to the web-enabled clock. This transfer would happen at a daily rate, at a time set by the user. For example, if the web-enabled clock used an internal modem to connect to the internet, it would dial the service provider at a set time, when the line wasn't being used. This would most likely occur at a time after the user had gone to sleep, so that any schedule changes that had occurred late in the given day would be transferred to the web-enabled clock in time to be expressed to the user the next morning.

A content response tagging function is provided by the web-enabled clock. The purpose of the response tagging function is to allow a user to select an item of content for some further action at a later time. For example, while listening to content being presented or played by the web-enabled clock, a user may be interested in learning more about a particular item that is presented, such as a song, advertisement, or news or affinity item. A number of softkeys are provided that are labeled by the display corresponding to various items of content that are being played or that have been played. The user would select the softkey that corresponds to the item of content of interest. The system would send this selection back through to the web-enabled clock server and provide more information to the user, either through aggregation of tags at a special website, or through emails sent to the user.

BRIEF DESCRIPTION OF THE DRAWING FIGURES

FIG. 9 is a web page showing the initial user setup interface on programming and content selection website.

FIG. 10 is a web page showing the user setup interface for selecting the custom or preset content selections on programming and content selection website.

FIG. 11 is a web page showing the preset wake-up routine interface.

FIG. 13 is a web page showing the custom wake-up-content offerings.

DESCRIPTION OF PREFERRED EMBODIMENT

Figure 1:
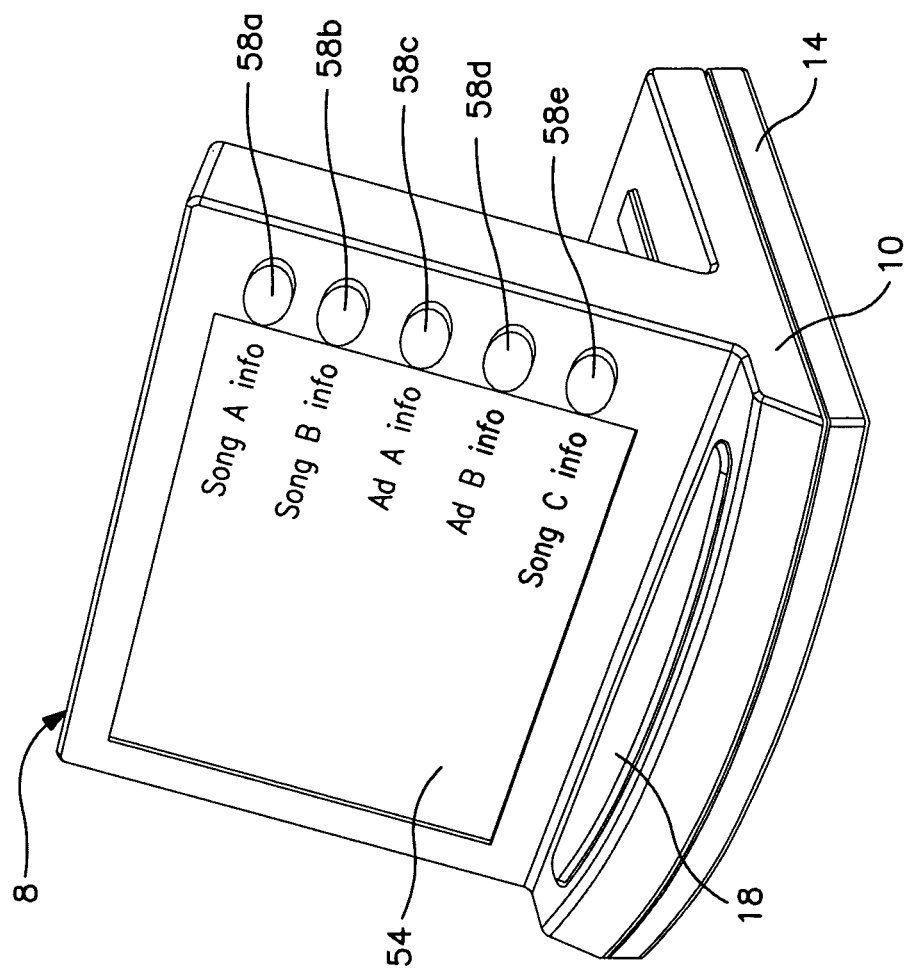
FIG. 1 shows an isometric front view of the web-enabled clock.
Figure 2:
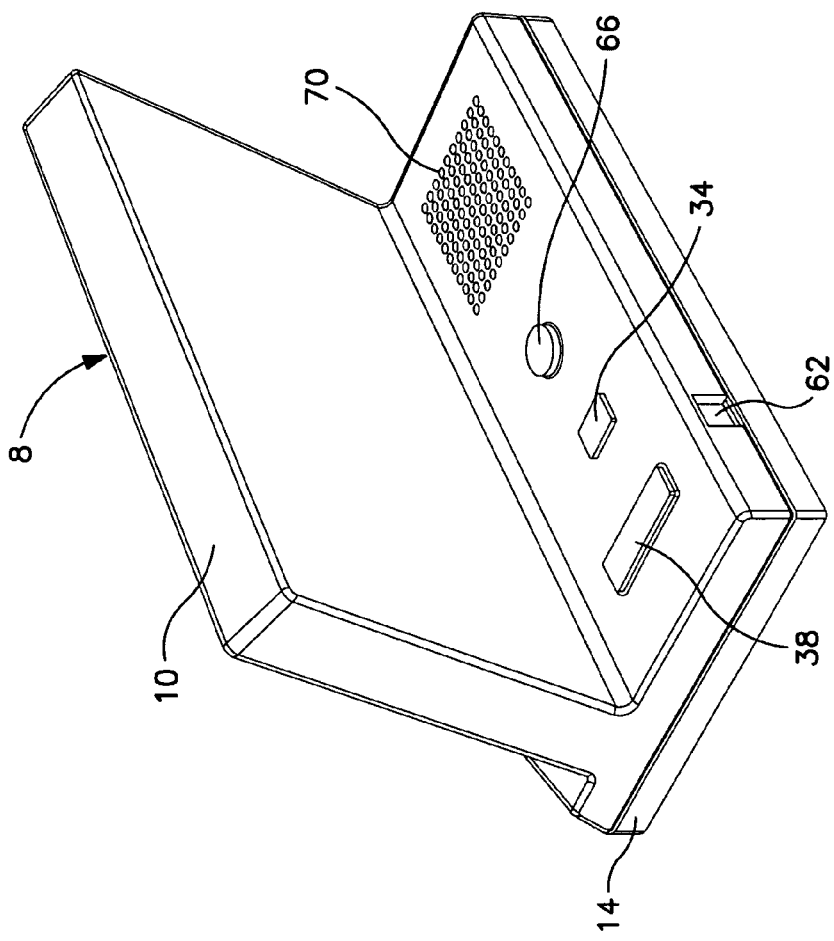
FIG. 2 shows an isometric rear view of the web-enabled clock.
Figure 3:
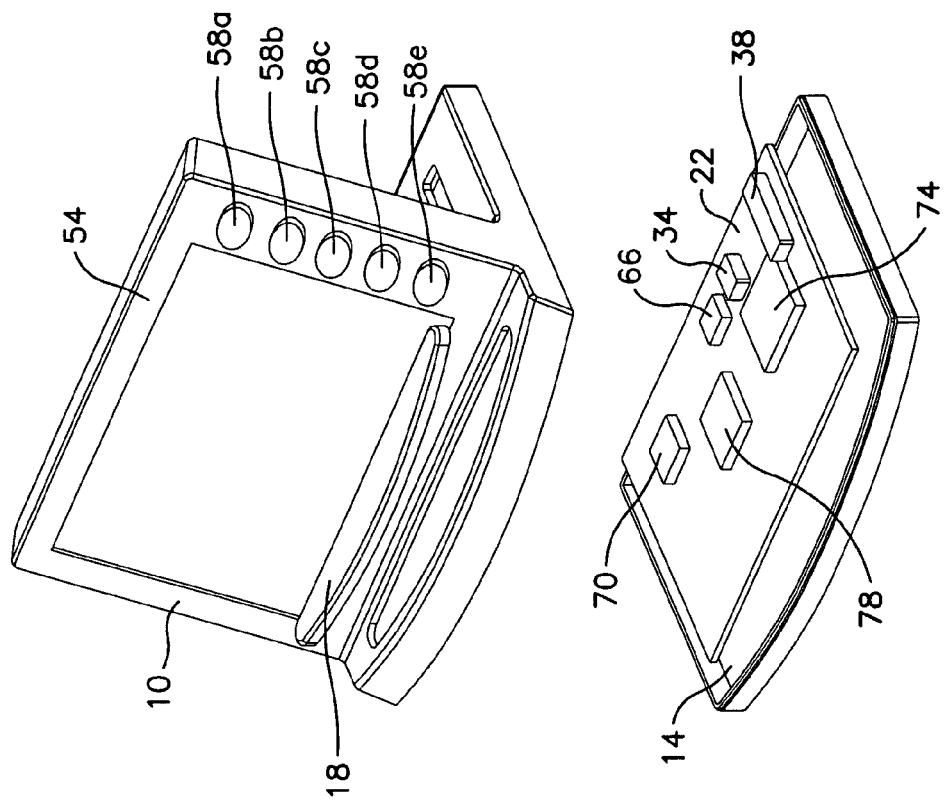
FIG. 3 shows an isometric exploded view of the web-enabled clock.
Figure 4:
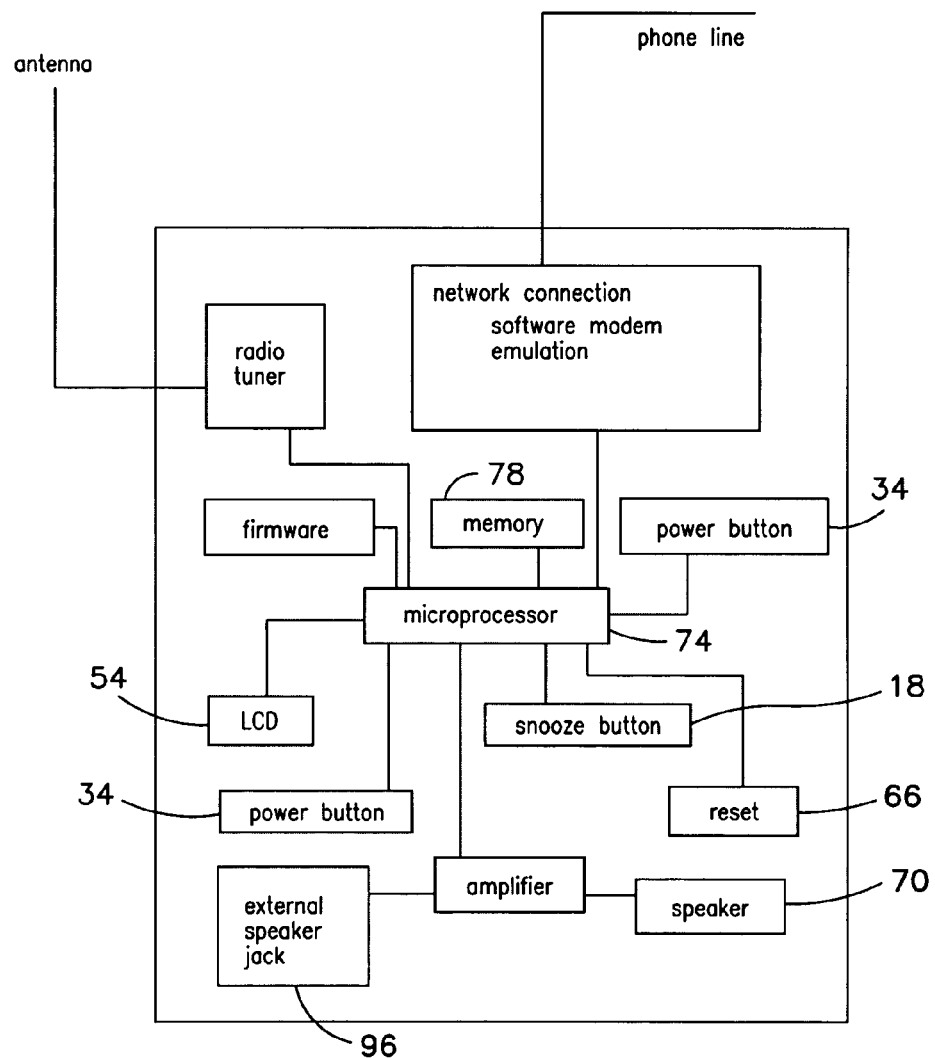
FIG. 4 shows a block diagram of the internal components of the web-enabled clock.

First a description of the apparatus and functional components of the system will be described, then their operation. As shown in FIG. 1, the web-enabled clock 8 is comprised of a housing that is similar to a traditional alarm clock housing. That is, the size is of a scale that could fit conveniently on a nightstand. There is a top housing 10 and a bottom housing 14 fastened together using threaded fasteners, which are not shown because this type of design is well known in the field of consumer electronics design. Top housing 10 and bottom housing 14 are manufactured using injection-molded plastic. FIG. 3 shows an exploded view of web-enabled clock 8. There is a printed circuit board 22 that electrically connects and mechanically supports a microprocessor 74, a quantity of system memory 78, and other electronic components that combine to control the functions of the web-enabled clock 8. FIG. 4 shows a block diagram of the internal functional components that comprise web-enabled clock 8. Also included in the electronic circuit is a timer subsystem for keeping track of the correct time and date. Web-enabled clock 8 also includes an output means, that is the method for the user to receive information from the web-enabled clock 8. FIGS. 1, 2, and 3 show a full color liquid crystal display (LCD 54) graphics module as the visual output, and an amplifier and speaker 70, for audio output. Web-enabled clock 8 includes input means, that is, a set of controls typically found on a clock or clock radio that allow the user to control the basic functions. The input means include a power button 34, a snooze button 18, a volume control 38, a radio-tuning button, an AM/FM band toggle, and a means for setting the current time and the alarm time. There are many interface systems, such as mode switches and the like, which are commonly used for setting the current time, alarm time, and date, on clocks and alarm clocks, and these buttons and functions will not be described in detail here for reasons of brevity. Referring again to FIG. 4, microprocessor 74 and memory 78 execute instructions from firmware that constitute a real-time operating system (RTOS) for controlling the web-enabled clock 8 functions including: responding interactively to button activations, connecting to the internet 110, downloading and storing programming and content, uploading user responses, receiving and executing new user-specified web-enabled clock 8 programming, playing downloaded content programs, playing content programs streamed directly from internet 110, and controlling graphic LCD 54 and sound output sub-systems. Firmware is stored in a flash memory chip that is a type of non-volatile memory chip, so that when power is turned off, the firmware instructions are still maintained. FIG. 1 also shows a series of buttons, referred to as softkeys 58a-e, vertically lined up along the right side, and in close proximity to, LCD 54. Softkeys 58a-e are electrically connected to and monitored by microprocessor 74 for activation during the operation of web-enabled clock 8.

FIG. 2 shows that web-enabled clock 8 includes an RJ-11 jack 62 for plugging the web-enabled clock 8 into a wall phone connection. Jack 62 serves as a port for communicating with the internet. The required phone cord and the AC power cord are not shown because these components are well known and their inclusion would be obvious to anyone trained in the field of electronic product design.

Connectivity/Network Functionality

Figure 5:
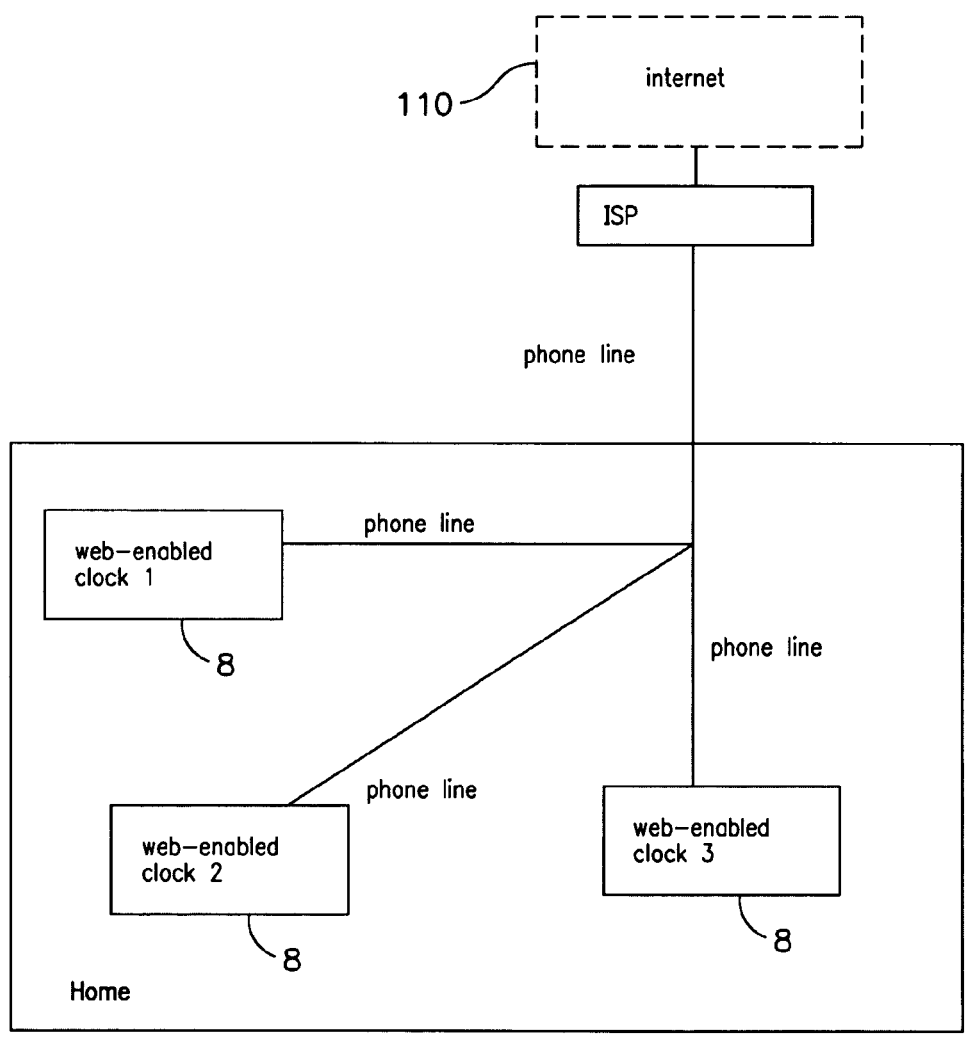
FIG. 5 shows a diagram of the web-enabled clock phone linked to the internet.

Web-enabled clock 8 initiates and maintains a connection to internet 110 via an internal software modem and jack 68. That is, microprocessor 74 can create and manage the transfer of bits that would otherwise be performed by a specialized modem chip. The emulation of a modem by microprocessor 74 is well known in the field of electronic design and will not be described here in detail. RTOS included as part of firmware also includes a network communication software component, in this embodiment, TCP-IP software. Microprocessor 74 and memory 78 execute instructions from network communication software to provide for the transfer of information between web-enabled clock 8 and a server located at the user's ISP, via a phone line. FIG. 5 shows multiple web-enabled clocks 8 or web-enabled alarm clocks 8 plugged into the phone line system in a home.

Operation—Online Programming and Control

Next the setup, programming and control of web-enabled clock 8 will be described. Some functions, such as current time setting and alarm setting, can be executed on controls located on web-enabled clock 8. This means of controlling a clock or alarm clock in this manner are well known and will not be described here in detail. However, the means for the user to program, control, and select a range of content that is to be sent to web-enabled clock 8 is through a programming and content selection website that is accessed via a PC 106 that is connected to internet 110. In general, the user of web-enabled alarm clock 8 makes selections for preferred content among many options provided at the programming and content selection website, and content prescribed by the user's preference choice is downloaded to web-enabled clock 8 automatically on a daily basis.

Figure 8:
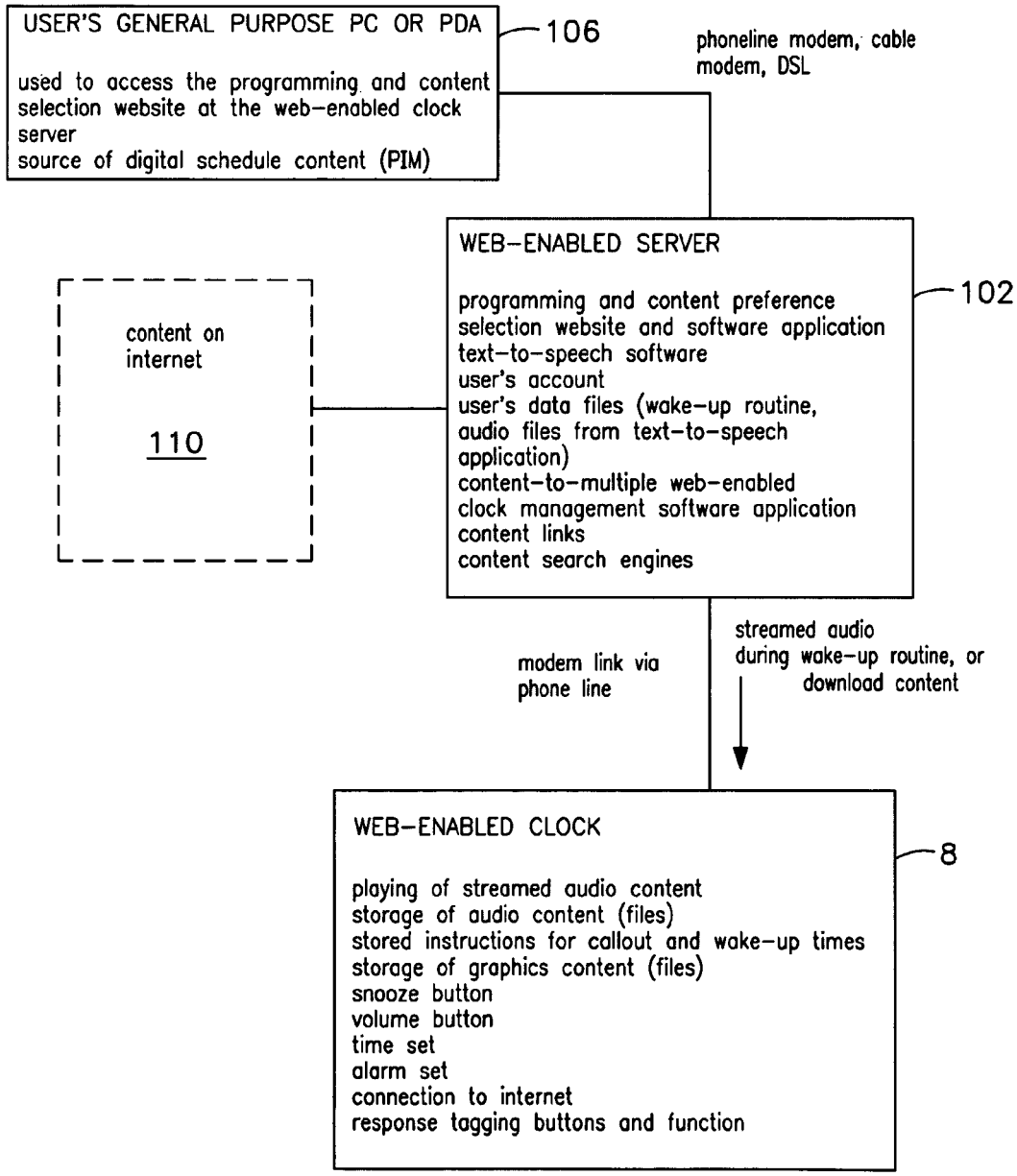
FIG. 8 shows a block diagram of the web-enabled clock system components with functions.

PC 106 connections to the internet 110, such as modems using phone lines, cable modems, and DSL, are well known among computer users and will not be described in detail here for reasons of brevity. FIG. 8 shows a block diagram and the functions that exist at each of the four elements of the system, which include: PC 106, web-enabled clock server 102, web-enabled clock 8, and the internet 110.

Figure 6:
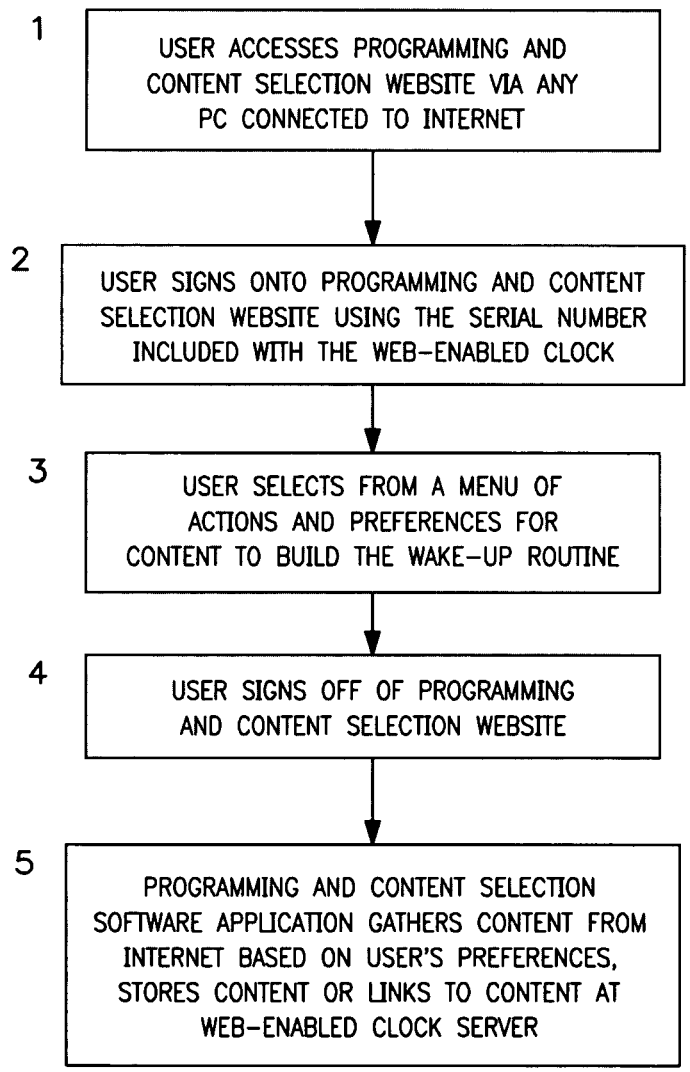
FIG. 6 shows a flow chart of the initial online setup of the web-enabled clock.
Figure 7:
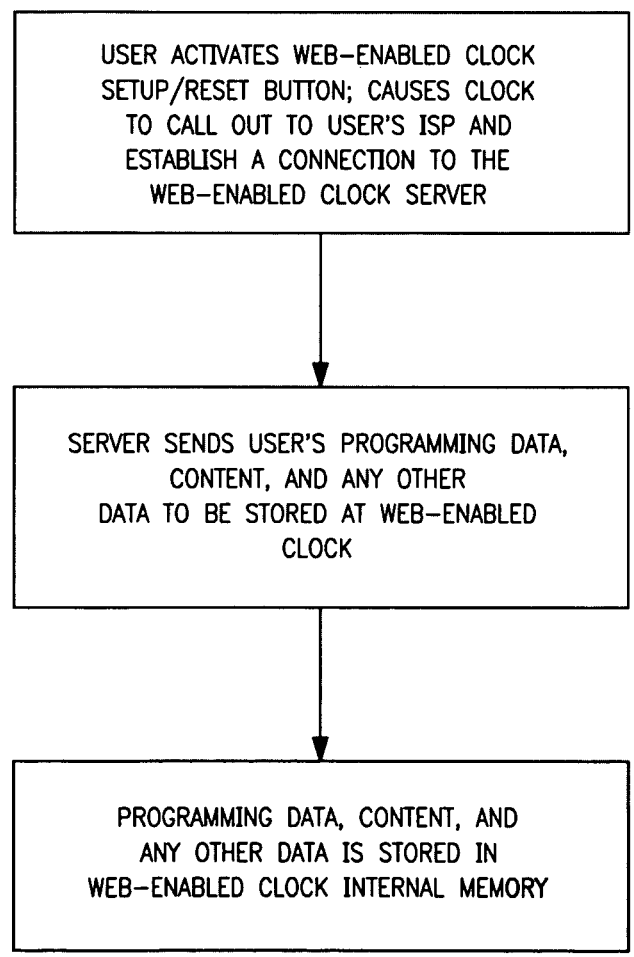
FIG. 7 shows a flow chart of the initial setup at the web-enabled device.

The programming and content selection website and the programming and content selection software application exist on web-enabled clock server 102 located at a web hosting service, functionally connected to the web. Web hosting service is a business that offers servers connected to internet 110 via fast connections on a fee basis, and will not be described here in detail. FIG. 6 lists the steps involved with the first-time set up of the web-enabled clock 8 or web-enabled alarm clock 8. The programming and content selection website is the HTML formatted interface that the user uses to interact and make selections for web-enabled clock 8 features and content. The programming and content selection software application is a software application that resides at web-enabled clock server 102 and processes the selections made by the user, among other functions. FIGS. 9 through 13 show web pages that contain common computer and web page interface elements such as pull-down menus 84, submit and reset buttons 86, check boxes 88, and browse buttons 90 that result in a dialog box. Rectilinear elements with rounded corners in FIGS. 9 through 13 designate graphical user interface buttons 92, which are selected by the user with the mouse pointer. All of these elements would be familiar to a person with some experience in web browsing, or a person skilled in the art of computer and web interface design, and these items or other common formatting or web software applications, such as XML, or the Java programming language, provided by Sun Microsystems of Mountain View, Calif., will not be described in detail here.

Referring now to FIG. 6, step 1, using PC 106 with a connection to internet 110, the user of web-enabled clock 8 would access the programming and content selection website located on web-enabled clock server 102 on internet 110. Due to the architecture of internet 110, it is implied that web-enabled clock server 102 is located remote from PC 106. FIG. 9 shows the set-up page on the programming and content selection website. Text fields are provided for the user to enter information such as name, address, and email address.

Again referring to FIG. 6, step 2, and FIG. 9, during the initial web-enabled clock 8 setup, a request at the programming and content selection website requires that the user enter a serial number that is included on the back of web-enabled clock 8, before continuing with other actions. This allows the programming and content selection software application to identify each unique web-enabled clock 8 for the purpose of organizing and matching user-selected programming and content. Thereafter, the steps in FIG. 6 are the same except the user need not perform step 2 if they use PC 106 because PC 106 will keep a cached record of their identity associated with the programming and content selection website. Additionally, the user will be asked whether they want to use a dial-up to their current ISP, or whether web-enabled clock 8 ISP should be used. When the user is finished entering information, the "submit" button is selected.

Referring now to FIG. 6, step 3, at the programming and content selection website, the user selects among options for the sequence of events and activation times, chooses among content domains, and/or chooses the audible and visual content that is to be presented during the operating interval of web-enabled clock 8. In the case of web-enabled alarm clock 8, the wake-up alarm functions and the content constitute the wake-up routine, and the operating interval of web-enabled alarm clock 8 begins when the user chooses to be awakened. For many users, this time is in the morning. FIG. 10 is a web page for programming and selecting content for a web-enabled alarm clock 8. FIG. 10 shows the selections for a preset wakeup and custom wake-up routines. The user is asked to choose between "preset" and "custom" wake up content. The user is also asked if schedule contents from digital personal information manager (PIM) software is to be synchronized with web-enabled alarm clock 8. If PIM software is to be synchronized, the user is asked to choose which version of PIM software is used. A pull-down menu is included here that allows the user to choose from several popular PIM software applications. In FIG. 10, Palm Desktop PIM software has been selected. Palm Desktop software is provided by Palm Computing of Mountain View, Calif. Users can also specify the number of days into the future for which they want to allow access to schedule events for web-enabled clock 8. This function provides for the fact that the user may not be connected to internet 110 every day, but may want to be alerted to schedule events everyday. Once the selections have been made, the "submit" button is activated by the user.

Thus an important function that web-enabled clock 8 performs is that portion of, or all of, the user's daily schedule that is visually and/or audibly presented to the user as part of the wake-up routine, or an audible alert signals to the user that there are items scheduled for that day. A schedule synchronizing software application is used to extract schedule data from a user's existing schedule database in the PIM and move it to web-enabled clock 8 server, where it can be sent to web-enabled alarm clock 8 during the communication interval. Schedule synchronizing software application is an applet, that is, a program that is temporarily obtained from web-enabled clock 8 server, but executed on PC 106. Every time PC 106 is connected to internet 110, and before each internet 110 connection session is terminated, schedule synchronizing software parses the PIM schedule contents for data corresponding to a specified number of days into the future, and uploads this data to web-enabled clock server 102 where it is saved in memory in a database associated with the corresponding owner of web-enabled alarm clock 8. The programming and content selection software application reformats the schedule data into a form that can be downloaded and presented on web-enabled clock LCD 54. This download process will be described in more detail below.

FIG. 11 shows the web page that is accessed if the user selects "preset wakeup routine". The "preset" routine is for first-time users or users who want to quickly set up web-enabled clock 8. Here the user can make general preference selections, such as a preferred radio station, style of music, or favorite morning TV shows. These selections are displayed in pull-down menus that provide a range of preference options. The user can also input a wakeup time, and designate whether it is AM or PM.

Figure 12:
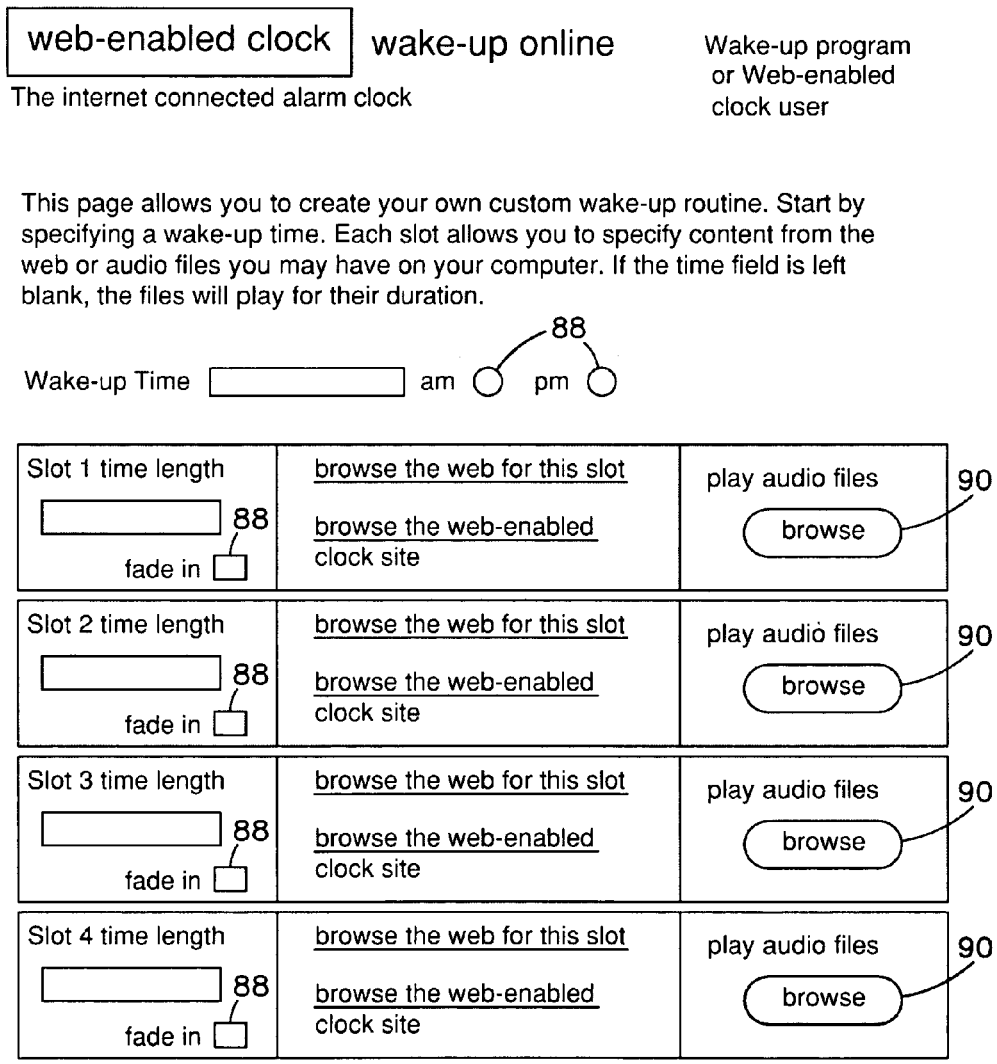
FIG. 12 is a web page showing the customer wake-up routine interface.

FIG. 12 shows the web page that is accessed if the user selects "custom wakeup routine", which provides a higher degree of customization and control over events and content. Again, the user can input the preferred wakeup time. Five time slots are shown, however if the user scrolls down the page, more time slots are presented. The total number of time slots available depends on the content that is selected and the size of memory 78 in web-enabled clock 8. The programming and content selection software application processes the user's selections and calculates the number of time slots presented to the user. In the text field labeled "Slot 1 time length", the user is to insert a desired length of time for the content selected for this time slot. It should be noted that the time lengths are desired lengths. The actual time lengths of the content items will vary. Next, the user has three options for selecting content for this time slot: "browse the web", "browse the web-enabled clock 8 site" and "play audio files". The "play audio files" selection has a browse button associated with it. This browse button activates a dialog box that allows the user to navigate to audio files that are stored on the user's computer, such as MP3 formatted audio files. If the user browses to and selects a specific MP3 audio file, this file is ultimately uploaded to web-enabled clock server 102, and either downloaded to or streamed to web-enabled clock 8, depending on the speed of the internet 110 connection.

If "browse the web for this slot" is selected, a second browser window is initiated and the user can navigate to a website that may provide content in a format that can be used by the web-enabled clock 8. An example of such a link would be to an audio file on a specific topic of interest to the user.

If "browse the web-enabled clock 8 site" is selected, the page shown in FIG. 13 is shown, representing content selections that have been prescribed or pre-chosen as web-enabled clock 8 content. For example, in FIG. 13, block A would contain a linked logo for "CNN", block B is a logo link for "MSNBC", and block C is a logo link for "CNNfn". So the user may choose "CNN" for news items, or "CNNfn" for financial news items, and so on. In practice, this page would contain many more links to a wide variety of content sources. In fact, the content links in this area may constitute many web pages. These content links are provided by the enterprise that operates the programming and content selection website, thus, these content links are designed to be compatible in format with web-enabled clock 8. Some amount of content that is made available to web-enabled clock 8 users is manually selected and formatted for web-enabled clocks 8. Other items of content are found automatically by internet 110 search engines, a software application that is a component of the programming and content selection software application. The search engine searches Internet 110 for content based on the parameters of web-enabled clock 8 requirements, and based on the user content preferences that are entered at the programming and content selection website.

Another selection that is available on this page is the ability to send a message to the owner of another web-enabled clock 8. If this selection is made, a subsequent page would be displayed that asked for the name of the web-enabled clock 8 owner, and a text field is provided to allow the message to be written. This message would then be sent to be included as text content during the next operating interval scheduled for the other web-enabled clock 8 user.

Referring now to FIG. 12, the time slots represent a temporal organization of the content that is to be presented by the web-enabled clock 8, that is, the content selected in time slot 1 is played first, and so on. It can be seen from these web pages how a custom wake-up routine can be created that activates the playback of many different kinds of audio and graphic content. At the bottom of the web page shown in FIG. 12, there is a "submit" button that the user would activate once they were finished adding content into time slots in the wake-up routine.

An initial hardware setup procedure is required, after the user has finished the initial set-up at the programming and content selection website. Web-enabled clock 8 is plugged into AC power and also connected to a phone line. Reset button 66 is pressed and held for several seconds, starting a sequence of events whereby web-enabled clock 8 automatically dials an 800 number that is specially set up so that each web-enabled clock 8 can reach a known ISP and receive its initial programming instructions from the user's database at the programming and content selection website on web-enabled clock server 102.

Automatic Operation

Figure 14:
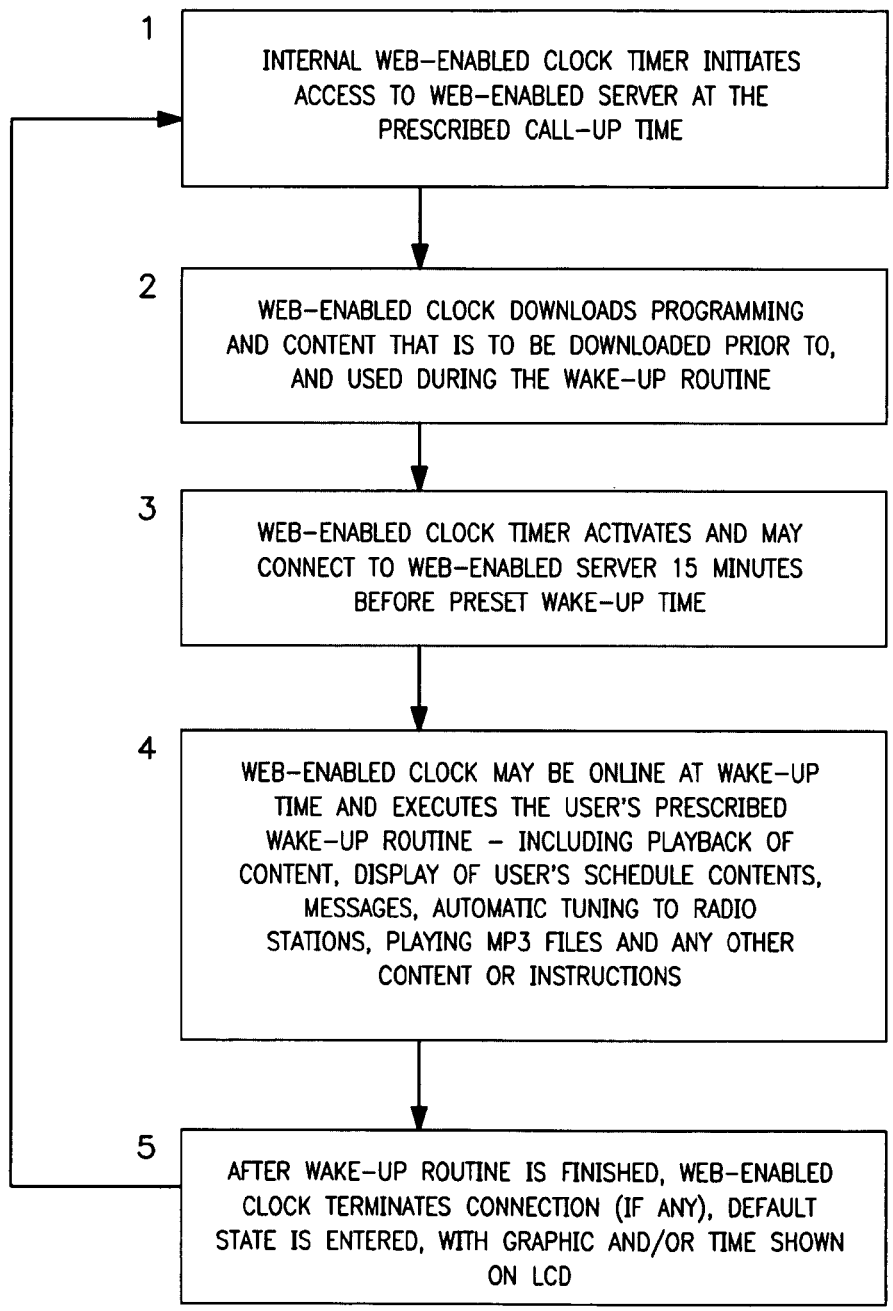
FIG. 14 is a flow chart describing the general operation of the web-enabled clock in playback mode.

FIG. 14 is a flow chart that shows the daily periodic events by which web-enabled clock 8, used as an alarm clock, and hereafter referred to as web-enabled alarm clock 8, is connected to web-enabled clock server 102 to receive programming and content that is to be presented to the user. There are two instances when web-enabled alarm clock 8 connects to internet 110, and these instances typically occur on a daily basis, or as prescribed by the user. The first instance, the communication interval, is for the purpose of the downloading of programming and content from web-enabled clock server 102 to web-enabled alarm clock 8. This instance typically occurs during the middle of the night. The second instance is during an operation interval, that is, during the time or times when web-enabled alarm clock 8 has been programmed to present content to the user. This instance occurs mostly in the morning, but operating intervals can be programmed at web-enabled alarm clock 8 and on the programming and content selection website to occur at any time. It should be noted that web-enabled alarm clock 8 can perform its function without having a live connection to internet 110 during an operating interval.

Referring now to FIG. 14, step 1, web-enabled alarm clock 8 activates and automatically dials out to the user's ISP and establishes a connection to web-enabled clock server 102. FIG. 14, step 2 shows that web-enabled alarm clock 8 receives any new programming instructions and content selections from internet 110 or from web-enabled clock server 102, and writes this data into memory 78. After the downloading session is finished, the connection to internet 110 is terminated and web-enabled alarm clock LCD 54 displays a default image and/or time and date.

FIG. 14, step 3 shows that approximately 15 minutes before the scheduled operation interval, such as the playing of a wake-up routine in this case, web-enabled alarm clock 8 may again establish a real-time connection to the internet 110, via a phone line call to the user's ISP. Whether or not a real-time connection to the internet 110 is established depends on the type of content that the user has requested, since some content is only useful if it is as new as possible. An example of content of this type is stock quotes. FIG. 14, step 4 describes the operating interval, the time when web-enabled alarm clock 8 activates and presents and plays content to the user based on the programming and selections made at the programming and content selection website.

FIG. 14, step 5 shows that when the wake-up routine operating interval is completed, web-enabled alarm clock 8 returns to an inactive state, displaying only graphic images and/or the time, as designated by the programming, until the internal timer activates web-enabled alarm clock 8 for the next communication interval. It should be noted here the web-enabled clock can also be programmed to constantly show images or play sound.

Figure 15:
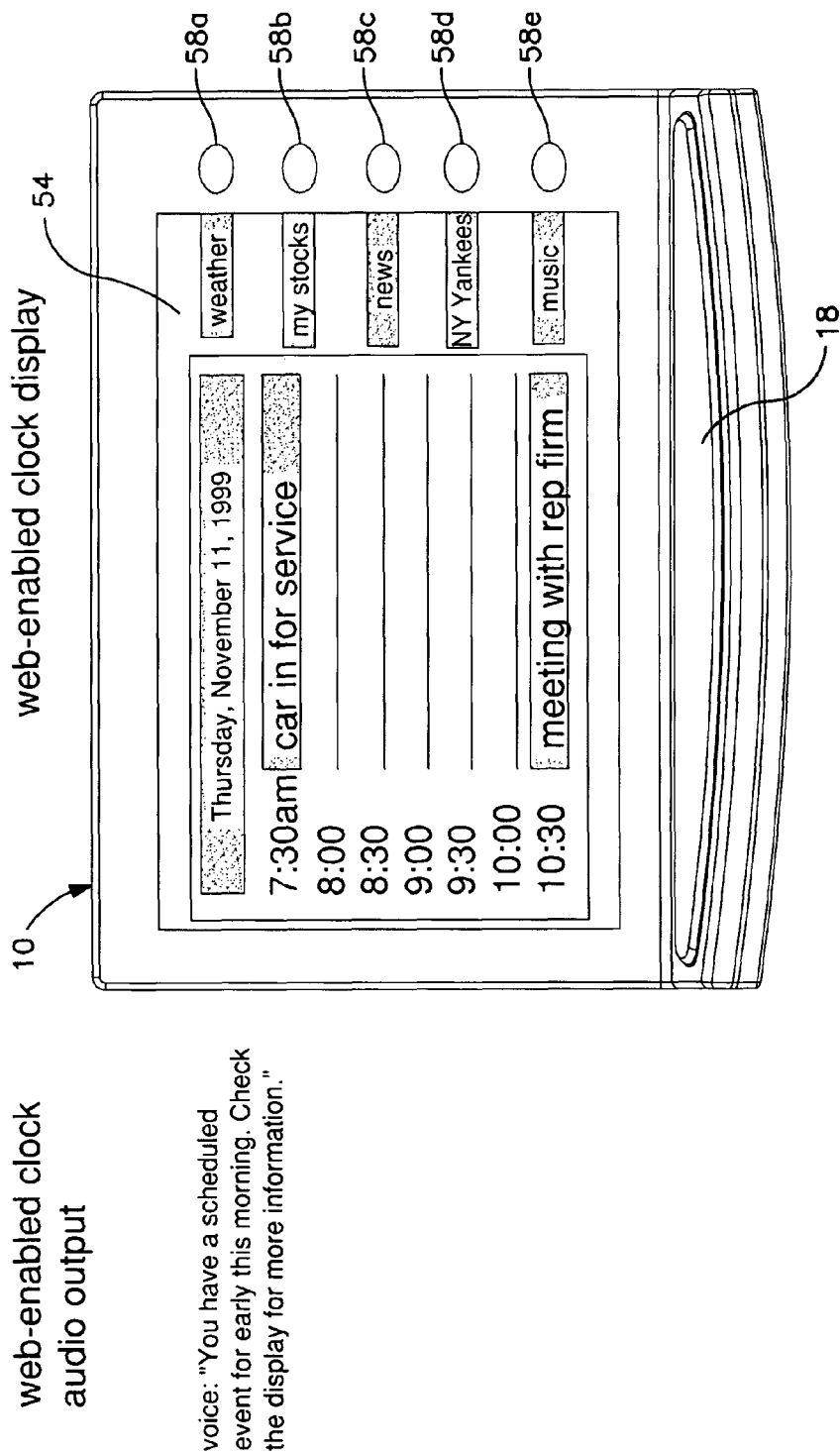
FIG. 15 is a front view of the web-enabled clock showing schedule information and labeled softkeys.

There are several functions that the web-enabled clock 8 can be programmed to provide, based on the user's selections at the programming and content selection website, as presented above. These include: displaying text describing scheduled events for that day; an audio alert is performed if there is an event scheduled earlier than a specified time; web-enabled alarm clock 8 is tuned to a radio-station of the user's choice for a specified length of time; news items in categories that are preferentially selected by the user are audibly presented to the user. FIG. 15 shows LCD 54 with the user's schedule contents presented.

Snooze button provides an input that halts the playback of content from memory 78, or deactivates the radio audio output from web-enabled alarm clock 8, for a specified period of time. The snooze period, the length of time for which audio output is deactivated, is an example of a programming parameter that may be set at the programming and content selection website.

Referring again to FIG. 12, another operational feature that can be controlled on the programming and content selection website is the ability to program a slow increase, or fade-in, in the audio output of web-enabled alarm clock 8 during the wake-up routine, rather than starting at full volume. An audio fade-in feature would allow the wake-up audio content to be less jarring than audio that starts out initially at full volume. FIG. 12 shows how each audio time slot can be set to fade-in the content selected therein.

Likewise, the brightness of LCD 54 on web-enabled clock 8 may be controlled as a product performance parameter. The backlight on LCD 54 could be programmed to gradually increase in brightness over a user-specified period of time. Again, this would make the act of waking up less jarring and more comfortable for the user.

The response tagging function will now be described. Referring now to FIG. 1, softkeys 58a-e are buttons that are vertically oriented and in close proximity to LCD 54. During the operating interval, as various items of content are presented audibly and visually, each softkey 58a-e may be labeled on LCD 54, each with a reference to a specific item of content. In FIG. 1 for example, during the time when advertisement A is being played, and for a period of time thereafter, softkey 58c is labeled as shown. If the user activates softkey 58c while it is labeled corresponding to advertisement A, web-enabled clock RTOS includes a function that will store this selection and match it with a description of the content, in digital format. During the next communication interval, web-enabled clock 8 will upload this response tag information to the programming and content selection website. The response tag information can be presented to the user in a number of ways. An email could be automatically generated that includes one or more links to information corresponding to the response tag information. The response tag information could also be aggregated at a specially treated web page or web pages, that contains multiple links to tagged content.

Another use for the softkeys and response tagging function is to provide interactivity to live radio broadcast content. The radio tuner subsystem of web-enabled clock 8 can be selected as the audio source and tuned to a particular radio station. The radio tuner could be a conventional analog radio tuner for AM and FM broadcasts. Or tuner could be a digital broadcast tuner. If the user designates that web-enabled clock 8 play a local radio station during part or even all of the wake-up routine, microprocessor 74 would enable tuner circuitry to receive the signal and amplify it so that it could be audible to the user. The specifics of a microprocessor 74 controlling a radio tuner are common and would be obvious to a designer versed in the design of products that include radios.

If the user specifies that web-enabled clock 8 enable RF tuner to tune to a particular station(s) as part of the wake-up routine, the RF frequency designation of the radio station (typically used as the name of a particular station, such as FM 98.5) would be stored as data in web-enabled clock memory 78, and/or in memory at the web-enabled clock server 102. Thus, RTOS could also establish a link to that particular radio station(s) website, and establish links or other content that can be displayed at web-enabled clock 8 on LCD 54. For example, if the user designated as the wake-up routine that after any schedule alerts are expressed, web-enabled clock 8 should tune to a local specific music station that broadcasts at 98.5 megahertz on the FM tuning scale, then web-enabled clock 8 could also present links corresponding with each softkey, for content that is being played from the 98.5 station. Thus web-enabled clock 8 and the programming and content selection software application can function as a DNS (Domain Name Server) for the radio stations being played. This system could also work for radio content that is being streamed digitally on internet 110. In this case, web-enabled clock 8 would be required to have a real-time connection to internet 110 during the operating interval.

Referring now to FIG. 1, if the radio station at 98.5 played Song A, Song B and then played Ads A and B, there could be text links next to each softkey 58a-e that the user can activate to receive more information on Songs A and B and Ads A and B. The web-enabled clock server 102 contains a database list of radio stations in a given region and their broadcast signal frequencies and their URLs and IP addresses. When the user selects a certain station, the programming and content selection software application matches this station with the appropriate URL and connects the web-enabled clock 8 with the station's URL. In this scenario, the radio station would make this information available on their server in such a way that it could be redirected via the web-enabled clock server 102, to the respective web-enabled clocks 8.

If, for example, the user was listening to a particular song as part of the wake-up routine, the title and author of the song could be displayed aligned with one of the softkey buttons. If the user wanted to obtain more information about this song or artist, they would simply press the corresponding softkey 58. The web-enabled clock 8 would record this event and communicate it back to the web-enabled clock server 102, which in turn would send an email to the user's email address that contains a link related to the artist or record company. The delivery of subsequent information to the user based on their activating a labeled softkey 58 could take many different forms, the delivery of an email being only one. For example, a new channel button for the artist's or record companies website could be automatically added to the user's channel bar on their PC 106.

Alternatively, if the radio broadcast is digital, information about what is being broadcast may be sent along with the audio content. For example, if a song is being played, the song's title and author could be included in the signal. The web-enabled clock 8 could extract this information from the RF signal and present it to the user on the web-enabled clock LCD 54. Again, if the user wanted more information regarding this broadcast content, the user would activate the corresponding softkey 58 with the corresponding label and they would subsequently receive information in the form of an email or some other delivery medium, as mentioned above. Another function that would be programmed into web-enabled alarm clock 8 is a function that would alert the user if a communication interval was attempted and the connection to the internet 110 failed, or if a operation interval was attempted and the connection to the internet 110 failed. In this case, the user would be alerted to the fact that the content that was provided may not be the most recent information available. For example, if a communication interval was attempted and a connection to internet 110 was not possible, the latest data from the user's PIM schedule would not be sent to web-enabled clock 8. The user should be made aware of this situation. The alert would consist of a text message and/or an audible alert or voice message.

Next, other functions and peripheral systems will be described, as well as other potential sources of content for web-enabled alarm clock 8.

If the user maintains a digital schedule on a PDA with a wireless connection to the internet 110, or other mobile computing device with wireless communication capability, such as a cellular phone with an integrated schedule application, any changes to user's schedule would be automatically communicated to the user's account database on the programming and content selection website. The software application that controls the wireless device would include a function to send schedule changes to the user's account at the web-enabled clock server 102 soon after they occur. Thus, the user's wake-up routine always has the latest schedule information.

The user of web-enabled clock 8 could select from a large variety of audio content that is currently available on the internet 110. Additionally, there is a growing availability of music and other audible content, such as books that are read aloud, on the internet 110. MP3 is an example of a digital audio format that was created to allow the efficient transfer of music and other audio content across internet 110. News in various categories such as late-breaking news, financial news, sporting event scores and other sporting news, is available on internet 110 either as discrete audio or audio-video files, or as streaming data. The wake-up routine for the web-enabled clock 8 could include the playing of MP3 files, or these other audio files or audio sources.

Although the description above contains many specificities, these should not be construed as limiting the scope of the invention, but merely providing illustration of some of the presently preferred embodiments of this invention.

Additional Features and Alternative Embodiments

In the case of the integral radio, the user could tune or program the radio via controls on the web-enabled clock, or it could be controlled via the software application on the internet, and the instructions would be downloaded.

Another mode for bringing interactivity to radio is to allow user responses to be communicated immediately back to the radio station that is eliciting the response. For example, a radio station could make an offer over the airwaves that requires an immediate response. In this case, a number of users are listening to this broadcast on the web-enabled alarm clock with the web-enabled alarm clock connected to the internet via a real-time connection. Each web-enabled alarm clock would decode the broadcast frequency and locate a domain name based on a look-up table at the web-enabled clock server. Thus, when the user activates one of the softkeys, the response is sent via the internet back to the radio station's website that is currently being tuned to by the web-enabled alarm clock. In this way, radio stations may execute real-time interactive promotions with end users.

In the case of a system where the web-enabled alarm clock 8 receives programming and content from the internet, a system that allows the user to change programming parameters by calling an 800 number could be established. For example, if a user wanted to change the wake-up time while traveling, the user would call an 800 number that is maintained by the enterprise that operates the web-enabled clock server. This 800 number would operate with via a voice recognition system, where the caller is prompted by an automated voice menu system.

The programming and content selection website could also provide the ability to create even more customized wake-up routines. For example, the user could be provided with a wake-up routine development kit, which would allow the user to piece together various length sections of audio files. For example, the user might want to listen to 10 or 20 seconds of a certain music selection, and then a segment of a comedy show. The user would be able to piece these audio segments together. Furthermore, the programming and content selection website and software application could let the user share this custom-designed wake-up routine with other users. For example, there could be a "buddy list" that would allow users of the web-enabled clock to send wake-up routines to other users.

The text-to-speech function of the web-enabled clock would be achieved as follows. A user of the web-enabled clock would have to maintain a schedule in digital form, such as the scheduling aspect of the Palm Desktop software, as described above. Each day in the example user's scheduling software has a data field where the user can enter text describing the events scheduled for that day. The schedule synchronizing application would search the user's Palm Desktop database for relevant scheduled events, and would transfer the text that is entered into the user's schedule, associated with each block of time (for example, from 9 am to 9:30 am) for this time frame to the web-enabled clock server. It would be stored in a secure file that is associated with the user's web-enabled clock online account and serial number. These text files would then be processed by a text-to-speech software application, such as text-to-speech software made by Lucent, or Softvoice software. Text-to-speech software is known in the art of software interface design and software applications of this type have been available for several years. The textto-speech software would create an audio file such as a .wav file, for each of the user's schedule entries. These audio files would also be stored in a secure section of the web-enabled clock server associated with the user's account. In the morning during the wake-up routine, each audio file associated with that day's scheduled event or events is streamed or downloaded to the web-enabled clock, where the audio file is converted into sound. Thus the user can hear an audible expression of their schedule for that day. The user can select when the cutoff time is for reading that day's events. For example, the user may only want to know about events that are scheduled for the morning, or events that are scheduled before a certain time.

The schedule event alert feature of the web-enabled clock could be implemented such that text-to-speech software technology is not used, but rather, a pre-recorded voice could communicate to the user that the user has an item scheduled at a certain time. This pre-recorded voice would instruct the user to view the web-enabled clock display for a detailed description of the scheduled event. Using this system, a wide range of actual human voices could be offered to the user to program in as the schedule alert voice. The user could also be offered the opportunity to program in their own voice or the voice of an associate as the schedule alert, or the wake-up alert. Celebrity voices that are recognizable could be offered as the schedule or wake-up alert. FIG. 15 shows how the display would look in this system, along with the audible output. There could also be other types of graphical alerts associated with this audible alert, such as having the highlighted event blink, or have the LCD backlight flash on and off. These graphical alert features could be selected by the user when they program their wake-up routine. There could also be other types of graphical effects such as animations that could be used to gain the attention of the user. The audio alert that is used to signal to the user that there is a scheduled event need not be a voice, rather, it could be a tone, or a segment of music, or any other sound. FIG. 15 also shows how the web-enabled clock display would be arranged so that schedule information is shown along with the labels next to the softkeys.

Alternative Embodiment —Modal And Pre-Programmed Softkeys

Figure 16:
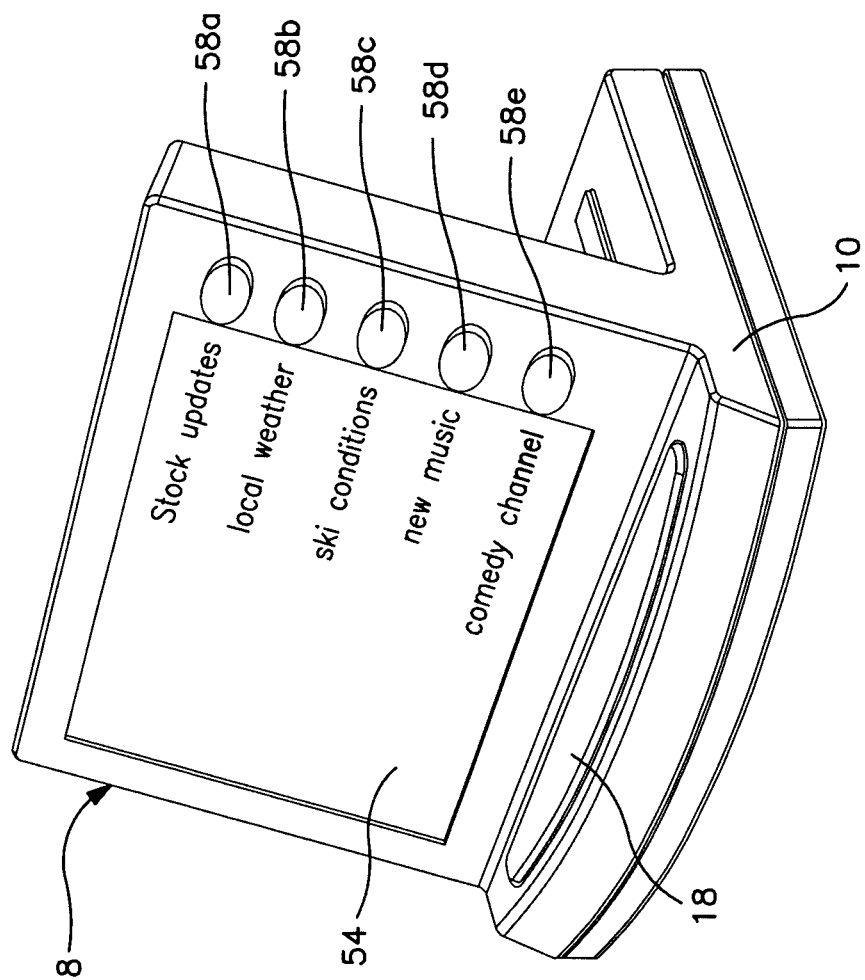
FIG. 16 shows an isometric view of the web-enabled clock with the softkeys programmed as preset content selection buttons.

Another use for the softkey system is based on the fact that the softkeys are modal, that is, each button can have many different functions and labels, depending on the mode of the device and the programming of the softkeys. The use of this system here is that for example the user could set up the function of each of the softkeys on the online application that the user uses to create and program the wake-up routine. Each user can have their own functional setup of the softkeys. The user can specify each of the softkey buttons to activate a certain type of content to be played, much like preset radio station buttons on car stereos. When the web-enabled clock is running its wake-up routine, the display includes labels for each of the softkeys. FIG. 16 shows an example of how softkey labels may be set-up by a user. For example, when the user is awakened by the initial output of the web-enabled clock, the user can reach over and push any of the softkeys, depending on what content the user wants to hear or see.

The web-enabled clock could also display information relevant to or related to the audio output that is being played during the wake-up routine. For example, if the user has chosen a selection of music to be played, information about a band or a graphic of the band could be displayed. If for example the user has chosen certain stock prices to be communicated, these stock prices could also be displayed on the LCD. The LCD could also contain advertising graphics.

A wide variety of items could be presented in this way, offering the user the ability to receive more information at a later time. For example, one of the offerings on the web-enabled clock wake-up routine website could be to receive a "vocabulary word of the day". If the user requested this service, every morning as part of the wake-up routine, a new word would be read to the user. An offer to have the word and definition sent to the user via email would be one of the button labels. If the user selected this button, an email would automatically be generated and sent to the user containing the word and definition.

Alternative Embodiment —Connection Through PC

Figure 17:
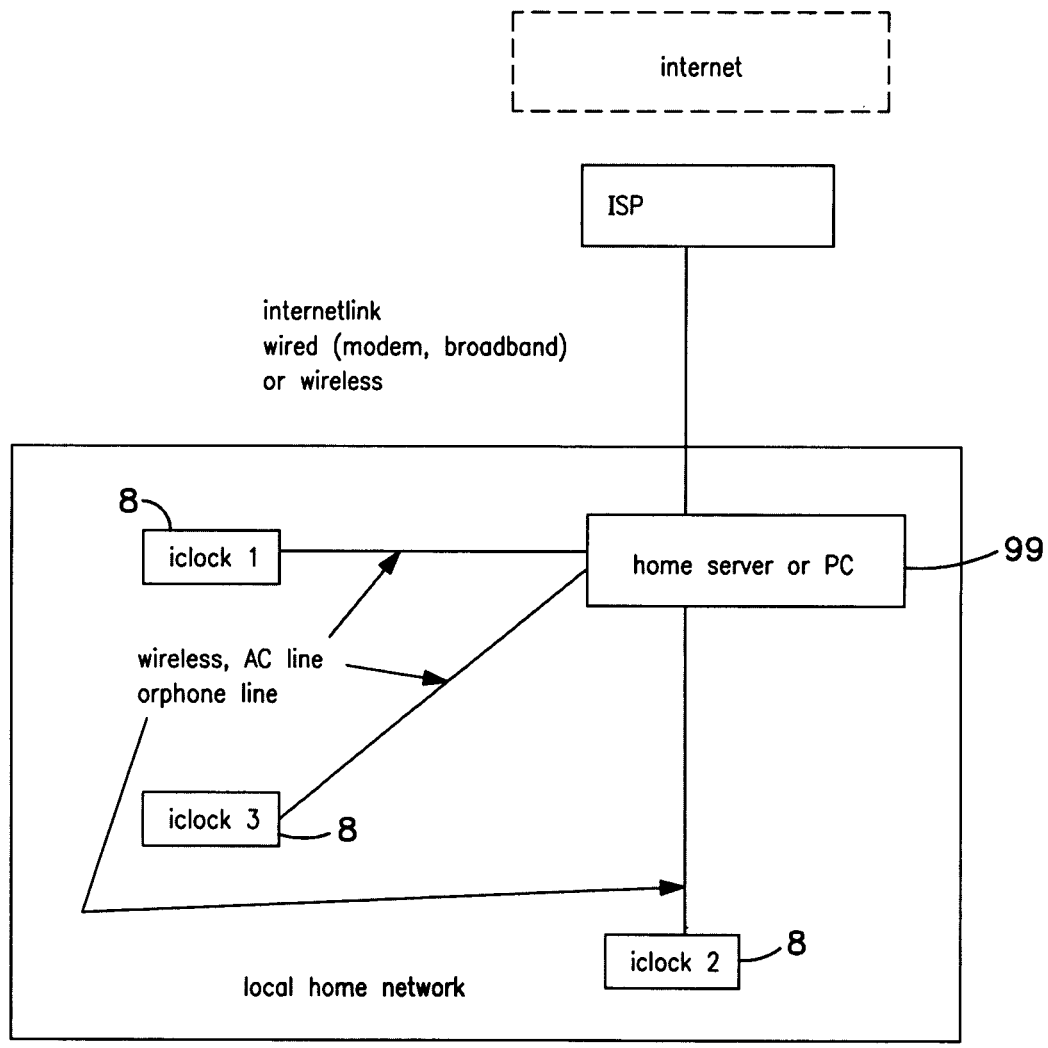
FIG. 17 is a diagram of a system that uses a central home server to provide content to each of several web-enabled clocks.

Another embodiment for the web-enabled clock is a system whereby the web-enabled clock includes a wireless connection to a local PC, such as the system shown in FIG. 17. A means for implementing this system would be to connect the web-enabled clock to the PC or home server 99 via a wireless connection, such as a Bluetooth communication protocol. Bluetooth is a wireless LAN communication system consisting of a set of hardware (integrated circuits, etc.) and firmware, and is manufactured by many large communication component manufacturers, such as Motorola, of Shaumberg, Ill. Another LAN connection means would be to use a system that uses the AC wiring of the house to link devices together. An example of this is the AnyPoint™ system manufactured by Intel of Santa Clara, Calif. The system could also be implemented with HomeRF™, another wireless system that is more expensive than Bluetooth, but is also faster and with longer range. HomeRF™ wireless technology is provided by Proxim, of Sunnyvale, Calif.

The PC or home server would be left on (operating) although it would be allowed to enter a "suspend" or "sleep" mode, or any type of low-power consumption mode. The Windows98™ operating system, provided by Microsoft Corporation of Redmond, Wash., supports modes where the hard disk drive stops spinning, and the monitor is turned off, yet all the while the computer is on, that is, the microprocessor 74 is operating and can execute instructions. Windows98™ allows the scheduling of tasks at a preset time. For example, a web-enabled clock manager software application that is installed on the PC could create a "scheduled task", which is a set of software instructions, which would be activated at a time prior to the wake-up time. This "scheduled task" would cause the PC' to exit any the power saving mode (spin up the hard drives, etc.) and dial out to the web-enabled clock server. Upon making a connection to the web-enabled clock server, the PC would handle all of the communication between the web-enabled clock server and the web-enabled clock, by communicating to the server via the online connection, and communicating with the web-enabled clock via the wireless or AC wiring communication link.

The home PC would receive and store all of the content files, such as still images, text files such as those containing PIM schedule contents, MP3 files, full motion video files (such as those in MPEG formats), animations, and text-to-speech audio files that were created by the programming and content selection software application. At the time of the wake-up routine, the PC would stream the audio content to the web-enabled clock, and also send any other files, such as graphics files, to the web-enabled clock. In the embodiment, the web-enabled clock has to have very little internal memory 78 because most of the computing work is performed by the PC.

The text-to-speech translation software could also exist on the individual user's PC, and in that case, the translation would occur there, and the audio files could be streamed to the web-enabled clock. The user would use the programming and content selection website as a place to go to find content that is organized and suggested for use with the web-enabled clock. It would also provide all of the custom content services such as messaging between web-enabled clock users.

The PC also allow direct streaming of internet content from a source on the internet, such as the programming and content selection website, or other sources, through the PC, through the wireless hub, to the web-enabled clock. Or the system could function as with the content presented to the user via the web-enabled clock as a combination of real-time streamed content and content that has been cached at the PC.

Another system design for one or more web-enabled clocks is to include LAN technology, for example a wireless LAN transceiver as described above, in each web-enabled clock. The wireless hub that serves data to each of the web-enabled clocks would be connected directly to a home broadband gateway, which is a cable or DSL modem with an integral router. Home gateway products of this type are becoming well known. In this case, the content for the web-enabled clock would either be stored at the web-enabled clock, or the content would be streamed to the web-enabled clock, or some combination of streaming or caching would occur. Internet connections and LAN systems of this type represent an "always on" system, where the connection to the internet is live and always present and ready to transmit data. There is no "dialing" to create the functional connection.

As another alternative to this embodiment, the programming interface for the web-enabled clock could also exist entirely on a local PC. In this system, the user need not establish a connection to the internet to program the web-enabled clock, rather, the user could make choices for programming and content based on a programming and selection software application that exists on the PC and information that is cached on the PC, and this information would be transferred directly between the PC and the web-enabled clock via one of the LAN systems described above.

Alternative Embodiment —Wireless Wide Area Network (WAN)

The network functionality web-enabled clock could also contain a wireless wide area network (WAN) transceiver that would connect it directly to the internet. wireless transceiver that can provide this function is provided by Metricom, of Mountain View, Calif. Metricom's product is called a Ricochet wireless modem, that provides 128 Kbps data rate. The transceiver circuit and components could be incorporated into the web-enabled clock housing, with an external antenna. This wireless link is close to broadband speed and is "always on".

The wireless function could be a cellular-type of communication architecture, where the connection to the internet is made via a connection between the web-enabled clock with an internal cellular phone wireless chipset, and a cell that is external to the house. Cellular communications chipsets are available for purchase by Nokia of Finland, and Motorola, of Schaumberg, Ill., and are widely available, and most often found in cellular phones. The use of this type of communications architecture is well known in the field of cellular phone design, and this knowledge would be easily applied to the web-enabled clock.

The programming interface could also exist on a PDA or a custom programming device that is connectable to the web-enabled clock. This connection to the web-enabled clock could be through any number of means already mentioned such as a modem, or a wired or wireless network connection. Or, for example, the web-enabled clock could be programmed by using a PDA. A program would run on the PDA that would allow the user to setup the web-enabled clock with the desired functions. Then the PDA would upload this setup data to the web-enabled clock via a wireless port such as an RF port or an infra-red communication transceiver.

The web-enabled clock could also include a slot for adding more memory for the purpose of allowing the web-enabled clock to download and store more content and programming. Compact flash is a well known technology utilizing flash memory on small removable flash memory cards. With this feature, users could upgrade their web-enabled clock if they required more content capability, for example, the ability to download and playback more MP3 formatted songs.

As shown in FIG. 4, the web-enabled clock could also incorporate an audio signal output jack 96 so that the user could connect an external set of speakers, if higher fidelity sound is desired. The audio electrical standards for this type of external speaker connection are well known in the art of radio or sound playback device design.

The display included in the web-enabled clock need not he a full color graphics LCD. The display could be a simple digital segmented display, for the purpose of reducing the cost of the device, although the value of the display is limited as an advertising medium.

What is claimed is:

1. A system comprising:
a device comprising an alarm clock; and
a computing device configured to:
communicate with the device;
access content from a networked environment; and
stream data and the content to the device in response to a request received from a user at the device, wherein the request is communicated from the device to the computing device, wherein the content comprises audio content,
wherein the device is configured to automatically render the audio content on the device at a specific time in accordance with a user-defined schedule, and wherein the streamed data from the computing device includes information regarding the user-defined schedule.

2. The system of claim 1, wherein the computing device is configured to download the content from the networked environment via a server.

3. The system of claim 2, wherein the networked environment is an internet.

4. The system of claim 3, wherein the device is identified to allow organizing the content according to user preferences.

5. The system of claim 1, wherein the device includes a memory to store the content.

6. The system of claim 1, wherein the streamed data from the computing device includes digital schedule content for personal information management, and wherein the digital schedule content includes the information regarding the user-defined schedule.

7. The system of claim 6, wherein the device is configured to automatically render the digital schedule content on the device at the specific time in accordance with the user defined schedule.

8. The system of claim 1, wherein the device comprising the alarm clock is wirelessly coupled to the computing device.

9. The system of claim 1, wherein the alarm clock is configured to operate in accordance with the user-defined schedule.

10. The system of claim 1, wherein the computing device is configured to select a content source on the networked environment based on parameters related to technical specifications of the alarm clock.

11. The system of claim 1, wherein the device is configured to automatically begin streaming the content to the device at a predefined amount of time prior to the specific time at which the device is configured to automatically play the audio content.

12. The system of claim 1, wherein the playing the audio content on the device comprises transitioning the device from an inactive state to an alarm state, and wherein the device is configured to return to the inactive state at a predefined interval after the specific time at which the device is configured to automatically play the audio content.

13. A method comprising:
   accessing, by a computing device, content from a networked environment based on user preferences, wherein accessing the content comprises streaming the content, and wherein the content comprises audio content;
   storing the content by the computing device; and
   streaming data and the content from the computing device to a device comprising an alarm clock, wherein the data includes a user-defined schedule such that the device automatically renders the audio content at a specific time in accordance with the user-defined schedule.

14. The method of claim 13, further comprising identifying the device to organize the content, wherein the content is stored in the device.

15. The method of claim 13, further comprising reformatting the content to allow the device to display the content.

16. The method of claim 13, wherein the content is streamed to the device via a computer.

17. The method of claim 16, further comprising wirelessly coupling the device to the computer.

18. The method of claim 13, wherein the content is streamed from the networked environment via a server.

19. The method of claim 13, further comprising terminating a connection to the networked environment after storing the content.

20. An alarm clock comprising:
   an interface configured to receive data and content from a server via a network, wherein the data indicates a user-defined schedule, and wherein the content comprises audio content; and
   a display configured to automatically render the audio content at a programmed time according to the user-defined schedule, wherein the received content is relevant to a content preference selection.

21. The alarm clock of claim 20, wherein the received content includes schedule content for personal information management.

22. The alarm clock of claim 20, wherein the content is reproduced as part of a wake-up alarm process.

23. The alarm clock of claim 20, wherein the data comprises streaming data.

24. A method comprising:
   receiving, at a computing device, a user-defined schedule from a server device;
   streaming, by the computing device, media content from the server device in accordance with the user-defined schedule, wherein the content comprises audio content; and
   automatically rendering, by the computing device, the audio content at a specific time in accordance with the user-defined schedule.

* * * * *